(12) United States Patent
Ghaffour et al.

(10) Patent No.: US 10,099,948 B2
(45) Date of Patent: Oct. 16, 2018

(54) SPIRAL-SHAPED DISINFECTION REACTORS

(71) Applicant: King Abdullah University of Science and Technology, Thuwal (SA)

(72) Inventors: Noreddine Ghaffour, Thuwal (SA); Fariza Ait-Djoudi, Blida (DZ); Wahib Mohamed Naceur, Blida (DZ); Sofiane Soukane, Algiers (DZ)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 741 days.

(21) Appl. No.: 14/627,804

(22) Filed: Feb. 20, 2015

(65) Prior Publication Data

US 2015/0232355 A1    Aug. 20, 2015

Related U.S. Application Data

(60) Provisional application No. 61/942,357, filed on Feb. 20, 2014.

(51) Int. Cl.
| | | |
|---|---|---|
| *B01F 3/08* | (2006.01) | |
| *B01F 5/06* | (2006.01) | |
| *B01J 19/00* | (2006.01) | |
| *C02F 1/68* | (2006.01) | |
| *C02F 1/76* | (2006.01) | |
| *B01F 5/00* | (2006.01) | |

(52) U.S. Cl.
CPC .............. *C02F 1/76* (2013.01); *B01F 3/0861* (2013.01); *B01F 5/0647* (2013.01); *B01J 19/006* (2013.01); *B01J 19/0053* (2013.01); *C02F 1/686* (2013.01); *B01F 2005/002* (2013.01); *B01F 2005/004* (2013.01); *B01F 2005/0037* (2013.01); *C02F 2303/04* (2013.01)

(58) Field of Classification Search
CPC .................. B01F 3/0861; B01F 3/0865; B01F 2005/0002; B01F 2005/002; B01F 2005/0037; B01F 2005/004; B01F 5/0647; C02F 1/686; C02F 1/76; C02F 2303/04; C02F 2301/026; B01J 19/00; B01J 19/0053; B01J 19/006; B01J 19/0066

See application file for complete search history.

(56) References Cited

U.S. PATENT DOCUMENTS

| | | | | |
|---|---|---|---|---|
| 4,146,478 A | * | 3/1979 | Rongved | ............... C02F 3/1257 210/195.3 |
| 2010/0314327 A1 | * | 12/2010 | Lean | ..................... B01F 5/0647 210/738 |

* cited by examiner

*Primary Examiner* — Lucas A Stelling

(74) *Attorney, Agent, or Firm* — Patent Portfolio Builders PLLC

(57) ABSTRACT

This disclosure includes disinfection reactors and processes for the disinfection of water. Some disinfection reactors include a body that defines an inlet, an outlet, and a spiral flow path between the inlet and the outlet, in which the body is configured to receive water and a disinfectant at the inlet such that the water is exposed to the disinfectant as the water flows through the spiral flow path. Also disclosed are processes for disinfecting water in such disinfection reactors.

18 Claims, 15 Drawing Sheets

(4 of 15 Drawing Sheet(s) Filed in Color)

SPIRAL-SHAPED DISINFECTION REACTORS

BACKGROUND

1. Field of Invention

The present invention relates generally to water disinfection systems, and more specifically, but not by way of limitation, to water disinfection reactors.

2. Description of Related Art

Examples of disinfection reactors are disclosed in U.S. Pat. No. 3,235,003 and in Pub. No. US 2013/0292342.

Water related to human activity has to be of proper quality to avoid waterborne diseases. The disinfection of water for consumption has proven to be effective for destroying or deactivating pathogenic microorganisms (Cardot, 2002), especially those responsible for typhoid fever and cholera. Pathogenic microorganisms include bacteria, fungi, protozoa, and insects (Moles, 2007). Bacteria have a relatively weak resistance to disinfection, while protozoa and viruses have a relatively high resistance to disinfection.

Chlorination has become a common method for disinfecting water and is generally effective at reacting with and destroying or deactivating most microorganisms. Since the discovery and use of chlorine as a disinfectant, the number of illnesses and deaths related to the consumption of contaminated water has significantly decreased. Additionally, apart from destruction or deactivation of microorganisms, chlorine can be used to eliminate metals and undesirable tastes or smells in water. Chlorination is a simple process and is relatively inexpensive.

However, chlorine also reacts with organic material in the water (e.g. decaying leaves). These chemical reactions produce a family of harmful disinfection by-products (DBP), most commonly trihalomethanes (THM). DBP concentration in water depends on many factors; such as, for example, the amount organic matter, bromide ions, and free chlorine in the water, as well as the pH and temperature of the water. Even further, the amount of time that the chlorine is in contact with the water (exposure time) plays a large role in the amount of harmful DBP produced by chlorination. The majority of these harmful DBPs cannot be eliminated by further treatment. Therefore, exposure time needs to be carefully controlled—too short of an exposure time may result in inadequate disinfection, while too long of an exposure time may result in harmful DBP production.

Current disinfection reactors and processes are unable to sufficiently control the exposure time between water and a disinfectant. For example, when water and a disinfectant are introduced into existing reactors, large recirculation regions tend to develop. Water flow in the recirculation regions may travel slowly through the reactor, undergoing a relatively long exposure time to the disinfectant. On the other hand, water flow that avoids the recirculation regions may travel quickly through the reactor, undergoing a relatively short exposure time to the disinfectant. In at least this way, current disinfection reactors and processes exhibit a risk for both inadequate disinfection and harmful DBP production.

SUMMARY OF THE INVENTION

Some embodiments of the present disinfection reactors comprise a body defining a first opening, a second opening, and a spiral flow path extending between the first opening and the second opening, where a radius of curvature of the spiral flow path increases along the spiral flow path from the first opening to the second opening, and where the body is configured to receive water and a disinfectant at one of the first opening and the second opening such that the water is exposed to the disinfectant as the water flows through the spiral flow path.

In some embodiments, the spiral flow path is substantially planar. In some embodiments, no portion of the spiral flow path overlies any other portion of the spiral flow path. In some embodiments, the body comprises a sidewall disposed between adjacent portions of the spiral flow path. In some embodiments, the spiral flow path has a first length extending from the first opening to the second opening, and the sidewall has a second length that is substantially equal to the first length.

Some embodiments of the present disinfection reactors comprise a body defining an inlet, an outlet, and a spiral flow path between the inlet and the outlet, where the body is configured to receive water and a disinfectant at the inlet such that the water is exposed to the disinfectant as the water flows through the spiral flow path. In some embodiments, the inlet is in the interior of the spiral.

In some embodiments, the inlet comprises a plurality of openings. In some embodiments, the outlet is in the interior of the spiral. In some embodiments, the outlet comprises a plurality of openings.

In some embodiments the spiral flow path has a length extending from the inlet to the outlet, and a width that is substantially constant along the flow path length. In some embodiments, the spiral flow path is an Archimedean spiral. In some embodiments, an arc length, S, of the spiral flow path is a function of angle, $\alpha$, such that $S(\alpha) = \frac{1}{2}a\{\alpha\sqrt{1+\alpha^2} + \ln(\alpha+\sqrt{1+\alpha^2})\}$, where a is a constant indicative of the distance between two adjacent spiral arms.

In some embodiments, the reactor is configured to reduce recirculation regions in the flow on the flow path. In some embodiments, the reactor is configured such that disinfectant exposure time remains substantially uniform for water and disinfectant flow through the spiral flow path across a range of flow rates. In some embodiments, the spiral flow path is configured such that a known volume of tracer inserted at the reactor inlet with water flowing in the spiral flow path takes a time, $t_{10}$, for 10% of the tracer volume to pass the reactor outlet and a time, $t_{90}$, for 90% of the tracer volume to pass the reactor outlet, and such that $t_{90}/t_{10}$ is between 1 and 1.4 for water flow rates in an expected operating range for the reactor. In some embodiments, the spiral flow path is configured to encourage flow approximating plug flow. In some embodiments, the spiral flow path is configured to encourage flow approximating plug flow over a range of flow rates. In some embodiments, the spiral flow path is configured to avoid flow short-circuiting. In some embodiments, the exposure time between the disinfectant and the water is controlled by flow rate and spiral path geometry to inactivate as many microorganisms as possible without forming harmful by-products.

In some embodiments, the inlet is coupled to a mixing chamber. In some embodiments, the mixing chamber is configured to discharge overflow into the inlet.

Some embodiments of the present methods comprise introducing water and a disinfectant into an inlet of a spiral-shaped reactor having a spiral flow path and an outlet such that the water is exposed to the disinfectant in the spiral flow path and exits the outlet. In some embodiments, the disinfectant comprises chlorine. In some embodiments, the flow of the water and the disinfectant inserted at the inlet travel along the spiral flow path such that the flow of water and disinfectant approximates plug flow. In some embodiments, the flow of the water and the disinfectant inserted at the inlet has a substantially uniform exposure time in the spiral flow path across a range of flow rates. In some embodiments, the water and disinfectant are introduced by a mixing chamber into the inlet.

The apparatuses and processes of the present disclosure are suitable for use with any disinfectant, and any particular disinfectant referenced is used only by way of example and not by way of limitation.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 0.2, 0.3, 0.4, 0.5, 0.6, 0.7, 0.8, 0.9, 1, 5, and 10 percent, or any percentage in between.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any embodiment of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Some details associated with the embodiments are described above and others are described below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

DETAILED DESCRIPTION

Figure 1:
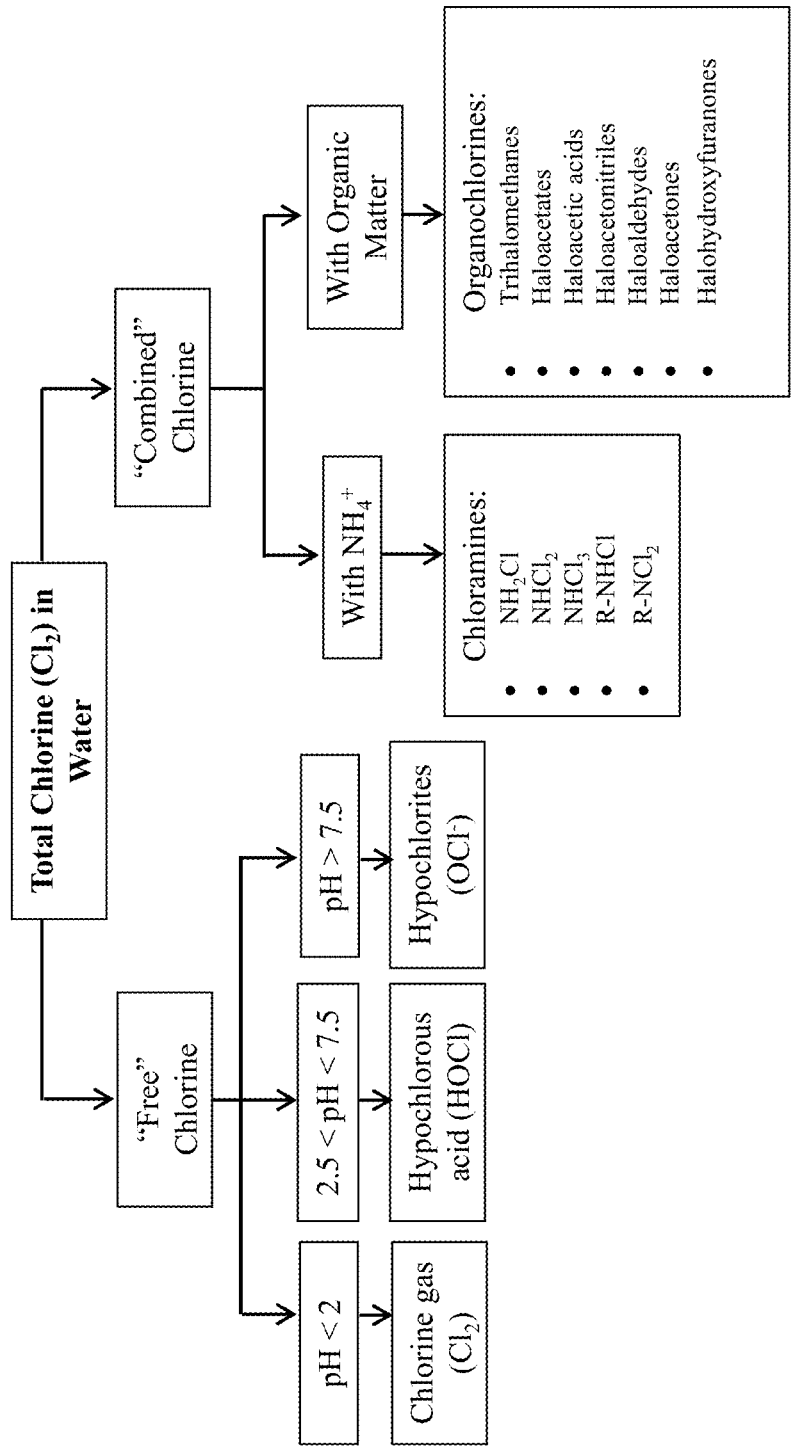
FIG. 1 is a flow chart of reactions chlorine gas ($Cl_2$) may undergo when introduced into water.

In some aspects, disclosed herein are water disinfection reactors that reduce the presence of recirculation regions and short-circuiting in flow through the reactors, providing for flow approximating plug flow and allowing for a consistent exposure time between water and a disinfectant flowing through the reactors over a range of flow rates. In these aspects, these reactors allow for the inactivation of microorganisms while minimizing the risk of harmful DBP production. In some aspects, these reactors comprise a body defining an inlet, an outlet, and a spiral flow path between the inlet and the outlet, where the body is configured to receive water and a disinfectant at the inlet such that the water is exposed to the disinfectant as the water flows through the spiral flow path.

1. Water Disinfection

Generally, disinfection is the final step in water treatment before distribution occurs, after purifying steps such as sedimentation or filtration (Moles, 2007). This can be important, as microorganisms may be protected from disinfection by suspended solids in the drinking water. Therefore, suspended solid content (TSS) in water before disinfection should be kept to a minimum, at most about 1 milligram per liter (mg/l). Additionally, the organic matter content should be minimized at an early stage to prevent the disinfectant from overreacting with the organic matter, which may lead to reagent overdose, difficulty maintaining adequate residual disinfectant in the system, bacterial regrowth during distribution, and the creation of harmful DBPs.

Disinfection is not sterilization, and small quantities of microorganisms may remain after water treatment (Cardot, 2002). This type of disinfection is referred to as "passive" disinfection, rather than bactericidal or "active" disinfection. (Moles, 2007).

TABLE 1 shows the safety standards for certain pathogen concentrations in drinking water.

TABLE 1

Safety Standards for Pathogenic Concentration in Drinking Water

| Pathogen | Concentration |
| --- | --- |
| *Escherichia coli* | Absent in 100 ml |
| *Enterococci* | Absent in 100 ml |
| Sulfate-reducing bacteria | Absent in 100 ml |
| Coliform bacteria | Absent in 100 ml |

Therefore, it is also important to ensure an adequate residual chlorine content to prevent these leftover microorganisms from later re-growing to hazardous levels (Cardot, 2002).

An ideal disinfectant must be available in large quantities at a reasonable price, must eliminate odors, must mix with water to form a homogenous solution, must have penetrating ability, must be safe in storage and transportation, must have a slow germicidal action to maintain residual for continued disinfection, must allow for easy measurement of its concentration in water, and must be effective at the temperatures of water consumption. An ideal disinfectant must also not be toxic to humans and must not damage metals or stain clothing (Tchobanoglous, 2002).

Disinfectants are generally oxidants and operate differently depending on the microorganism being destroyed or deactivated. For example, for bacteria, the disinfectant makes the cell membrane more permeable and also covers the macromolecular nucleic acids (DNA and RNA) to prevent reproduction. For viruses, the disinfectant enters the capsid proteins and alters the macromolecular nucleic acids.

More generally, the germicidal action of a disinfectant is based on the disinfectant's oxidizing ability, which is a function of pH and temperature. The effectiveness of a given disinfectant may be determined by the dose-time required to destroy or deactivate 99% of any given reference microorganism. This is indicated as a disinfectants $\overline{CT}$, and a lower $\overline{CT}$ indicates a more effective disinfectant (Cardot, 2002). Common reference microorganisms are *Escherichia coli* for bacteria, Polio for viruses, and *Giardia* cysts for protozoa (Cardot, 2002).

TABLE 2 provides the characteristics for four common types of disinfectants.

TABLE 2

Characteristics of Four Common Disinfectants

| | Chlorine | Chlorine dioxide | Ozone | Ultraviolet |
| --- | --- | --- | --- | --- |
| Disinfection capacity | Average | High | High | Medium-high |
| Oxidation capacity | Yes | Yes | Yes | No |
| Volatile action | Yes | A few days | A few minutes | No |
| Reactive with ammonia | Yes | No | No | No |
| By-product creation | Yes | Yes | Yes | No |
| Contact time required | Medium | Medium | Short | Short |
| Equipment size | Small-medium | Small-medium | Medium-large | Small-medium |
| Equipment reliability | Good | Good | Good | Good |
| Technological sophistication | Average | Average | High | Simple-average |
| Enterprise security | Yes | Yes | Moderate | Minimum |
| pH dependence | Extreme | No | No | No |

Therefore, it can be seen that disinfection power is often a function of the type of disinfectant, the exposure time, the temperature, the type of microorganism, the pH, and the relationship between the initial concentration of the disinfectant and the initial number of microorganisms (Ward, 1984).

2. Chlorine as a Disinfectant

As mentioned above, chlorine is the most common disinfectant currently in use. Chlorine has a high electronegativity, is a member of the halogen family, and is considered one of the most powerful oxidants. Chlorine is also efficient at destroying or deactivating microorganisms, has good residual power, is easy to use, and is relatively inexpensive (Gruau, 2004). Chlorine is a gas ($Cl_2$) at standard temperature and pressure (STP) (Moles, 2007), and TABLE 3 provides some of its properties.

TABLE 3

Properties of Chlorine ($Cl_2$)

| | |
|---|---|
| Molar mass | 70.906 (g/mol) |
| Physical state at 15° [C] | Yellow-green gas |
| Melting point | −101.00° (C) |
| Boiling point | −34.05° (C) |
| Critical temperature | 7710.83° (C) |
| Gas density relative to air | 2491 |
| Density at 0° [C] | 3.22 (g/l) |
| Solubility in water at 20° [C] | 7.3 (g/l) |

While chlorine gas ($Cl_2$) is the most common type of chlorine used for disinfection, chlorine may also be used in the form of sodium hypochlorite (NaOCl), calcium hypochlorite ($Ca(ClO)_2$), and chlorine dioxide ($ClO_2$).

Referring now the drawings, and more particularly to FIG. 1, chlorine gas may undergo several reactions when introduced to water, and these reactions can lead to the creation of many different forms of chlorine (Zhang, 2000). FIG. 1 provides a diagram of many of these reactions and the resulting forms of chlorine.

Chlorine may react with organic matter in water, as well as bromide and iodide ions, to form disinfection by-products (DBPs). Humic matter is a well-known source of such organic matter and is the result of the decomposition of organic material. The best-known DBP groups formed from these reactions are trihalomethanes (THM), haloacetates or haloacetic acids (AHA), haloacetonitriles, haloaldehydes, haloacetones, and halohydroxyfuranones (Mills, 1998).

For example, the formation of THM DBP's can be shown in the following substitution reaction (Montiel, 1980) (where R is the organic radical):

$$2R-CO-CH_3 + 3HClO \rightarrow 2R-CO-CCl_3 + 3H_2O \quad (1)$$

followed by hydrolysis:

$$R-CO-CCl_3 + H_2O \rightarrow R-CO-OH + CHCl_3 \quad (2)$$

Formation of such DBPs increases with the organic content, bromide content, chlorine dose, exposure time, and temperature of the water, or if the pH of the water is alkaline (Baig, 2008).

DBP concentration is a public health concern, and there are three primary methods of exposure to DBPs: ingestion, inhalation, and skin absorption. The first toxicological studies for animal DBP exposure were performed for THMs in the mid-1970s and for AHAs in the early 1990s (Mills, 1998) (Boorman, 1999). Since then, there have been many studies that attempt to characterize the epidemiological and toxicological properties of these compounds (Bellar, 1974) (Krasner, 2006) (Richardson, 2007). Some studies have linked exposure to DBP's with certain types of cancers such as bladder and colorectal cancer (Villaneuva, 2004) (Villaneuva, 2007). However, not much is known about the effect of DBP exposure on reproduction and child-development (Bove, 2002) (Lewis, 2006). Nearly 600 DBPs have been identified (Krasner, 2006).

The World Health Organization (WHO) has established guidelines for DBP concentrations in drinking water, and these guidelines are reproduced in TABLE 4.

TABLE 4

Maximum Allowable Concentrations of DBPs in Drinking Water

| Disinfection By-product | Maximum Concentration |
|---|---|
| Chloroform ($CHCl_3$) | 200 (mg/l) |
| Bromodichloromethane ($CHBrCl_2$) | 60 (mg/l) |
| Dibromochloromethane ($CHBr_2Cl$) | 100 (mg/l) |
| Bromoform ($CHBr_3$) | 100 (mg/l) |
| Dichloroacetic acid ($CHCl_2COOH$) | 50 (mg/l) |
| Trichloroacetic acid ($CCl_3COOH$) | 100 (mg/l) |

To prevent harmful additive effects of DBPs, the WHO further specifies that:

$$\frac{CHCl_3}{200} + \frac{CHBrCl_3}{60} + \frac{CHBr_2Cl}{100} + \frac{CHBr_3}{100} \leq 1 \quad (3)$$

where concentrations are in (mg/l).

Chowdhury and Amy have provided the only predictive model for AHA concentration. (Chowdhury, 1999). There are multiple predicative models for THM concentrations, but the most cited is from Amy, et al. (Amy, 1998), (Yoon, 2003), which is given as:

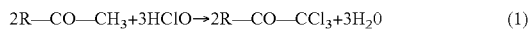
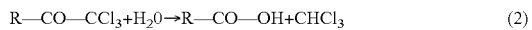

$$THM_{(mg/l)} = (10)^{-1.385}(DOC)^{1.098}(Cl_2)^{0.152}(Br^-)^{0.068} (T)^{0.609}(pH)^{1.601}(t)^{1.263} \quad (4)$$

where THM is the trihalomethane content of the treated water, DOC represents the dissolved organic carbon in the water, $Cl_2$ is the chlorine dose, $Br^-$ is the bromide ion content of the water, T is the temperature of the water, pH is the pH of the water, and t is time.

Such models may be useful for governments and other managers of water systems to monitor and regulate the amount of DBPs present in the water supply after treatment. (Gruau, 2004).

As mentioned above, exposure time is a key factor in ensuring proper destruction or deactivation of microorganisms as well as minimizing production of DBPs. Generally stated, the goal is to provide enough exposure time to destroy or deactivate an adequate number of microorganisms without producing a harmful level of DBPs. The CT (defined as the product of the concentration of a disinfectant and the exposure time of the disinfectant with the water being disinfected) of a particular disinfectant required to sufficiently deactivate or destroy a given microorganism may be used as a design criteria for disinfection reactors (e.g., chlorination tanks) $\overline{CT}$, the CT required for a given disinfectant to destroy or deactivate 99% of a given microorganism, for chlorine and various microorganisms at water temperatures between 5° and 25° (C.) are provided in TABLE 5 (Moles, 2007).

TABLE 5

CT for Chlorine and various Microorganisms

| Microorganism | $\overline{CT}\left(\dfrac{mg \cdot min}{1}\right)$ |
|---|---|
| Escherichia coli | .03 to .05 |
| Polio virus | 1.1 to 2.5 |
| Giardia lamblia cysts | 15-150 |
| Giardia muris cysts | 30-630 |
| Cryptosporidium cysts | 7200 |

3. Disinfection Reactor Design

From the foregoing, the inventors have concluded that disinfection reactors should be designed to ensure proper mixing of a disinfectant and water, as well as an exposure time between the disinfectant and the water sufficient to achieve the CT necessary to acceptably eliminate targeted microorganisms. Nevertheless, exposure time also needs to be controlled to avoid production of harmful DBPs. Notably, the $\overline{CT}$ required to destroy or deactivate protozoan cysts is nearly prohibitively high due to the risk of harmful DBP production at these CT levels.

Generally, the ideal goal for a disinfection reactor is to provide for plug flow of the water and disinfectant through the reactor (Anastasios, 2008). However, flow through previously known disinfection reactors deviates from plug flow. Such deviations can be analyzed by considering factors such as residence time distribution (also known as the flow through curve (FTC)), aggregation, and mixing characteristics (e.g., of fluid flowing through the reactor) (Levenspiel, 1999). Disinfection reactors may be considered chemical reactors and thus can generally be analyzed in the same way as chemical reactors. (Stamou, 2002) (Amini, et al., 2010) (Stamou, 2008) (Stamou, 1994).

The theoretical residence time for fluid flowing through a disinfection reactor is given as:

$$t_0 = \frac{V}{Q} \qquad (5)$$

where $t_0$ is the theoretical residence time for fluid flowing through the reactor (also known as the hydraulic contact time), V is the volume of the reactor, and Q is the flow rate of the fluid through the reactor.

In an ideal plug flow reactor, the residence time for fluid flowing through the reactor is equal to the theoretical residence time (e.g., the hydraulic contact time) (Moles, 2007). Therefore, any fluid that enters a plug flow reactor will leave at a time $t_0$ after its entry. In this way, an ideal plug flow reactor allows for precise and uniform exposure time between any water and disinfectant entering and flowing through the reactor. In precisely selecting an exposure time during reactor design, adequate disinfection can be ensured while minimizing the risk of DBP generation.

However, unlike a plug flow reactor, the design of previously known disinfection reactors may allow for some volumes of fluid to exit substantially more quickly than other volumes of fluid. For these short-circuiting volumes of fluid, the exposure time between the water and the disinfectant may not be enough to ensure adequate destruction or deactivation of microorganisms. Some designs have attempted to address these issues by placing simple sidewalls (e.g., baffles) in the reactor (Stamou, 2002) (Amini, et al., 2010). These sidewalls may reduce short-circuiting, but current sidewall design can lead to recirculation regions in the flow. Recirculation regions cause some volumes of fluid to stay in the reactor for substantially longer periods of time than other volumes of fluid, and thus may result in the creation of harmful DBPs. Therefore, such changes (e.g., baffles) do not always bring the reactor behavior close enough to plug flow.

The residence time for a volume of fluid, and thus the exposure time for the volume of fluid, may be tested through implementation of a straightforward procedure known as a "pulse experiment." In a pulse experiment, a known volume of tracer fluid is first inserted into the inlet of a reactor. The normalized mass fraction of this tracer fluid that exits the reactor may be measured as a function of time (Moles, 2007). In equation form, this can be described as:

$$\int_0^\infty E dt = 1 \qquad (6)$$

where E is the mass fraction of tracer fluid exiting the reactor at a time t. The E graph may also be known as a normalized average flow through curve (FTC) or an exit age distribution. Focusing on the FTC can be desirable, as many valuable flow characteristics can be derived from the FTC (e.g., flow short-circuiting, mixing, dispersion, efficiency, and/or the like) (Levenspiel, 1999) (Stamou, 2002) (Stamou 1994). As mentioned above, in an ideal plug flow reactor, all of the tracer fluid would exit at a time $t_0$ (EQ. 5) after its insertion into the reactor (e.g., an ideal plug flow reactor has a Dirac delta FTC). However, in practice, a typical figure used is $t_{10}$, which is the amount of time it takes for 10% of the tracer volume to exit the reactor divided (e.g., normalized) by $t_0$. The value $t_{10}$ can provide insight into the difference between the reactor and an ideal plug flow reactor (e.g., reactor efficiency). Generally, $t_{10}$ varies between 0.1 and 0.2 for most basic disinfection reactors, however, $t_{10}$ can be improved to about 0.5 to about 0.7 through the addition of sidewalls (e.g., baffles) (Moles, 2007). Other tracer fluid exit times may be normalized in the same way by dividing by $t_0$ such that:

$$\Theta_i = \frac{t_i}{t_o} \qquad (7)$$

where $\Theta_i$ is the normalized time corresponding to a time, $t_i$. Thus $\Theta_i$ can be used to represent the dimensionless time required for i % of the total tracer fluid volume to exit the disinfection reactor.

In this way, $\Theta_0$ and $\Theta_{10}$ values may be indicative of flow short-circuiting. Mixing and dispersion, being directly associated with the width of the FTC, may be indicated by the difference between $\Theta_{75}$ and $\Theta_{25}$ as well as the difference between $\Theta_{90}$ and $\Theta_{10}$. The ratio between $\Theta_{90}$ and $\Theta_{10}$, commonly referred to as the Morril index, is an additional measure of efficiency for a given reactor and may be particularly sensitive to flow short-circuiting (Stamou 1994). $\Theta_{50}$ can be used as yet another measure of efficiency. For an ideal plug flow reactor, $\Theta_0$, $\Theta_{10}$, $\Theta_{75}$, $\Theta_{50}$, $\Theta_{90}$, and the Morril index would all be equal to 1 (Kothandaraman 1974), given the Dirac delta function nature of an ideal plug flow reactor FTC.

Figure 2:
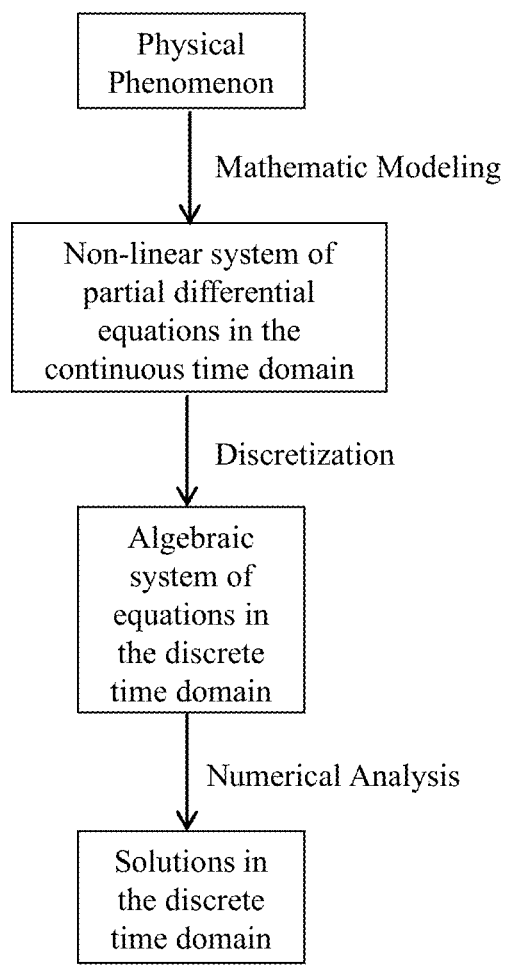
FIG. 2 is flow chart of a mathematical method that may be used to design at least some of embodiments of the present processes and apparatuses.

Referring now to FIG. 2, reactor design based on residence time (and thus exposure time) may be improved through the use of computational fluid dynamics (CFD) modeling, rather than experimentation, due to time and cost constraints (Anastsios, 2008). Generally, numerical models focus on tracer transport to assess disinfectant flow behavior within a reactor. Some early attempts at numerical modeling provided two-dimensional analyses of both momentum and tracer transport using a finite differences method with discretization stencils (Falconer, et al., 1997) (Wang, 1988) (Wang, 1998). Commercial CFD and mesh generation tools (discussed below) provide for more sophisticated analyses (e.g, such tools allow for sophisticated analyses of sidewall (e.g., baffle) geometry impact on reactor efficiency (Stamou, 2002) (Stamou 2008)).

CFD generally involves numerically solving partial differential equations that govern complex physical phenomena. Discretization allows the transformation of the partial differential equations into a system of algebraic equations that may then be solved through standard numerical analysis techniques (Popa, 2002). FIG. 2 provides a conceptual flow diagram of an example of these mathematical modeling techniques.

GAMBIT and Fluent are commercially available programs that allow a user to produce both two and three-dimensional simulations of fluid mechanics problems (Popa, 2002). GAMBIT can first be used to produce a mesh of the geometry of the problem. In GAMBIT, a user may also define boundary conditions. The mesh is then exported to Fluent, which solves the relevant equations of motion.

For the design of a reactor through CFD, the first equation that may be used is the simplified continuity equation (Bird, 2006):

$$\frac{\partial}{\partial x}\bar{u} + \frac{\partial}{\partial y}\bar{v} + \frac{\partial}{\partial z}\bar{w} = 0 \tag{8}$$

where x, y, and z are Cartesian coordinates, and $\bar{u}$, $\bar{v}$, and $\bar{w}$ are averaged fluid velocity components in the x, y, and z direction, respectively. The density term is not shown, as water is nearly incompressible.

The next equations that may be used are the balanced momentum equations, given as:

$$\left(\frac{\partial}{\partial x}\rho\overline{uu} + \frac{\partial}{\partial y}\rho\overline{vu} + \frac{\partial}{\partial z}\rho\overline{wu}\right) + \left(\frac{\partial}{\partial x}\rho\overline{u'u'} + \frac{\partial}{\partial y}\rho\overline{v'u'} + \frac{\partial}{\partial z}\rho\overline{w'u'}\right) = -\frac{\partial \bar{P}}{\partial x} + \mu\left(\frac{\partial^2 \bar{u}}{\partial x^2} + \frac{\partial^2 \bar{u}}{\partial y^2} + \frac{\partial^2 \bar{u}}{\partial z^2}\right) \tag{9}$$

$$\left(\frac{\partial}{\partial x}\rho\overline{uv} + \frac{\partial}{\partial y}\rho\overline{vv} + \frac{\partial}{\partial z}\rho\overline{wv}\right) + \left(\frac{\partial}{\partial x}\rho\overline{u'v'} + \frac{\partial}{\partial y}\rho\overline{v'v'} + \frac{\partial}{\partial z}\rho\overline{w'v'}\right) = -\frac{\partial \bar{P}}{\partial y} + \mu\left(\frac{\partial^2 \bar{v}}{\partial x^2} + \frac{\partial^2 \bar{v}}{\partial y^2} + \frac{\partial^2 \bar{v}}{\partial z^2}\right) \tag{10}$$

$$\left(\frac{\partial}{\partial x}\rho\overline{uw} + \frac{\partial}{\partial y}\rho\overline{vw} + \frac{\partial}{\partial z}\rho\overline{ww}\right) + \left(\frac{\partial}{\partial x}\rho\overline{u'w'} + \frac{\partial}{\partial y}\rho\overline{v'w'} + \frac{\partial}{\partial z}\rho\overline{w'w'}\right) = -\frac{\partial \bar{P}}{\partial z} + \mu\left(\frac{\partial^2 \bar{w}}{\partial x^2} + \frac{\partial^2 \bar{w}}{\partial y^2} + \frac{\partial^2 \bar{w}}{\partial z^2}\right) \tag{11}$$

where $\bar{u'}$, $\bar{v'}$, and $\bar{w'}$ are the averaged fluid velocity fluctuation components due to turbulence in the x, y, and z direction, respectively, $\rho$ is the fluid density, and $\mu$ is the fluid viscosity. It is important to include turbulence terms in order to ensure an accurate result since the Reynolds number of the flow through a given disinfection reactor is sufficiently high (turbulent) (e.g., to ensure adequate mixing between the disinfectant and water). Finally, the velocity components u, v, and w from the above equations may be defined as:

$$u = \bar{u} + u' \tag{12}$$

$$v = \bar{v} + v' \tag{13}$$

$$w = \bar{w} + w' \tag{14}$$

where $\bar{u}$, $\bar{v}$, and $\bar{w}$ are averaged over a time period long enough such that the velocity fluctuations (u', v', and w') due to turbulence are time independent.

These equations may then be used to evaluate the efficiency of a disinfection reactor or to design a new disinfection reactor based on values such as residence time (equivalent to exposure time between the disinfectant and the water). For example, a CFD simulation can be run and improvements to the reactor (e.g., geometrical changes and/or additions) can be made until a satisfactory design is reached (e.g., a design that possesses flow characteristics sufficiently close to plug flow). To perform a "pulse experiment," as described above, using a CFD model, a steady-state solution can be developed by setting the fluid mass fraction to 1 (e.g., water and disinfectant) and the tracer mass fraction to 0 at the inlet and running the simulation. Next, a transient tracer calculation can be initiated on the steady-state solution. At the initial time step of the transient tracer calculation, the fluid mass fraction can be set to 0 and the tracer mass fraction can be set to 1 at the inlet (e.g., to simulate a tracer volume of fluid being inserted into the inlet) (e.g., a "pulse"). After the initial time step, the fluid mass fraction can be reset to 1 and the tracer mass fraction can be reset to 0 at the inlet and the simulation can continue (e.g., through subsequent time steps). As the tracer volume exits the reactor (e.g., at each surface element of the outlet), the mass fraction of the tracer can be recorded as a function of time (e.g., for each time step), thus providing a FTC. The discrete from of the variance for such a numerical pulse experiment can be expressed as:

$$\text{var} = \frac{\sum_{i=1}^{n}(t_i - \bar{t})^2 w_i \Delta t_i}{\sum_{i=1}^{n} w_i \Delta t_i} \tag{15}$$

where $w_i$ represents the average tracer mass fraction at the reactor outlet at time step i, $\Delta t_i$ represents the time step at time step i, and n represents the total number of time steps after which tracer mass no longer appears at the reactor outlet. The variable $\bar{t}$ represents the average time for the tracer mass to exit the reactor and can be expressed as:

$$\bar{t} = \frac{\sum_{i=1}^{n} t_i w_i \Delta t_i}{\sum_{i=1}^{n} w_i \Delta t_i} \tag{16}$$

Assuming a constant time step $t_i$ and knowing that the total tracer mass fraction exiting the outlet over the entire simulation is equal to 1 reduces EQS. 15 and 16 to EQS. 17 and 18, respectively:

$$\text{var} = \Delta t \Sigma_{i=1}^{n}(t_i - \bar{t})^2 w_i \tag{17}$$

$$\bar{t} = \Delta t \Sigma_{i=1}^{n} t_i w_i \tag{18}$$

Substituting EQ. 18 into EQ. 17 gives:

$$\text{var} = \Delta t \Sigma_{i=1}^{n}(t_i - \Delta t \Sigma_{i=1}^{n} t_i w_i)^2 w_i \tag{19}$$

To illustrate some of the analysis and methodology used in this disclosure as well as some benefits of the present spiral-shaped disinfection reactors, various disinfection reactors are analyzed and compared.

4. Prior Art Rectangular Disinfection Reactor

Figure 3A:
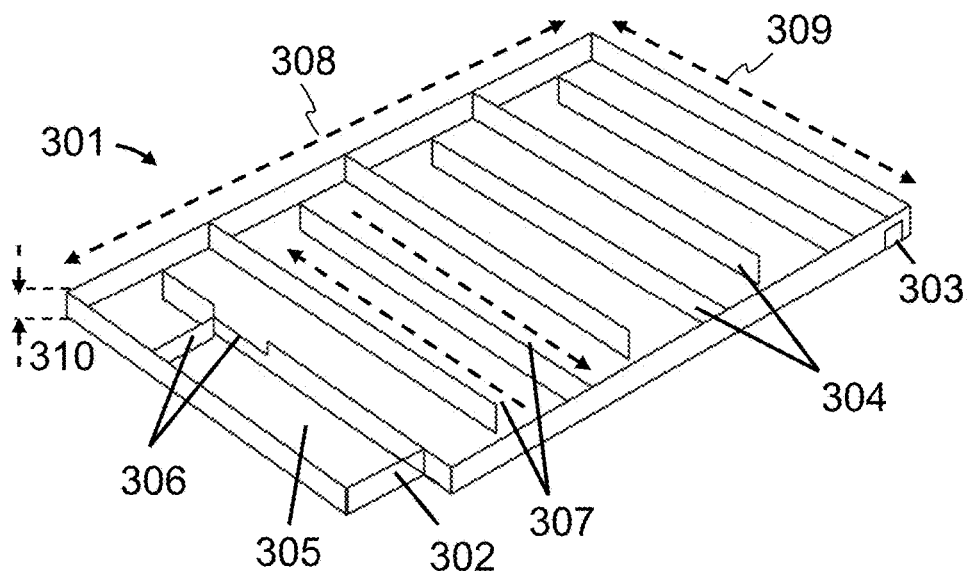
FIG. 3A is a perspective view of a prior art rectangular disinfection reactor.

FIG. 3A depicts a perspective view of a rectangular reactor 301. Rectangular disinfection reactor 301 comprises an inlet 302, a relatively small outlet 303, and six (6) baffles 304. In the reactor shown, inlet 302 leads to a mixing chamber 305, from which water can enter channels 307 of the reactor at two (2) locations 306 (e.g., by spilling over the shorter reactor walls, as shown). Baffles 304 define a flow path that travels along (7) channels 307. At least some of channels 307 provide for a water and disinfectant flow direction that is substantially opposite the flow direction provided for by adjacent channels (e.g., as indicated by the dashed arrows) (e.g., reactor 301 is configured such that flow reverses direction between each adjacent channel). Flow within reactor 301 travels approximately 700 m from inlet 302 to outlet 303. The reactor has a length 308 of 128 meters (m), a width 309 of 88 m, a height 310 of 6 m, and operates at a water depth of 5 m, resulting in a working water volume of approximately 50,000 cubic meters (m³). In order to focus the foregoing analysis on flow effects caused by channels 307, mixing chamber 305 may be modelled as a channel 307, resulting in disinfection reactor 301a, shown in FIG. 3B (e.g., a simplified model of disinfection reactor 301). Disinfection reactor 301a is substantially similar to disinfection reactor 301, with the primary exceptions of the difference noted above and that inlet 302a and outlet 303a are modified to allow water and disinfectant to enter and leave the reactor through an entire channel section (e.g., as opposed to entering at locations 306 and exiting through relatively small outlet 303 as in reactor 301). Disinfection reactor 301a comprises a working water volume of approximately 56,320 m³.

The first step to create a CFD model of flow in a reactor can be to generate a mesh of the reactor geometry. The process for generating a mesh may vary somewhat based on user preference. In this analysis, however, the geometry of the base of the reactor is first created. This geometry can include the locations of sidewalls (e.g., and/or baffles). The base may then be extruded to create the overall volume.

A mesh can then be generated for the reactor volume. A variety of element types and sizes are available, but it is generally important to pick an element size small enough to achieve accurate results, but large enough such that the run-time of the simulation is manageable. This may be done by sequentially reducing the size of the mesh elements and re-running the simulation until the results of the simulation become substantially independent of mesh element size. For example, an acceptable number of mesh elements can be from approximately 40,000 elements to approximately 50,000 elements.

The boundary conditions for the simulation can then be set in GAMBIT to include: (1) an initial normal fluid velocity at the inlet(s), (2) a pressure condition at the outlet(s), (3) no slip between the water and disinfectant flow and the bottom and side walls of the reactor, and (4) a zero shear stress condition at the top surface (to account for any open space between the fluid and the top of the reactor, assuming that the fluid surface is stable during disinfection). To set these boundary conditions, knowing the flow rate and the inlet area, the fluid velocity at the inlet can be calculated. The flow rate may be equal to the input section times the fluid velocity, or:

$$m = vA \quad (20)$$

where m is the flow rate, v is the fluid velocity, and A is the inlet section area. For example, for rectangular reactor 301a, the fluid velocity at the inlet can calculated as 0.55 and 0.44 meters per second (m/s) for respective flow rates of 3 and 1.5 m³/s.

The completed mesh with boundary conditions may then be exported to Fluent for solving. Fluent includes many mathematical models for turbulence simulation, but for this simulation the standard k-ε model can be selected. The turbulent energy (represent by k) and dissipation rate (represented by ε) can be assumed uniform, with values set to achieve an eddy viscosity of 90 times the viscosity of water (Stamou, 2002). An accurate solution from the Fluent solver may be shown by satisfaction of the continuity equation (EQ. 8) and convergence on all velocity components.

Figure 4:
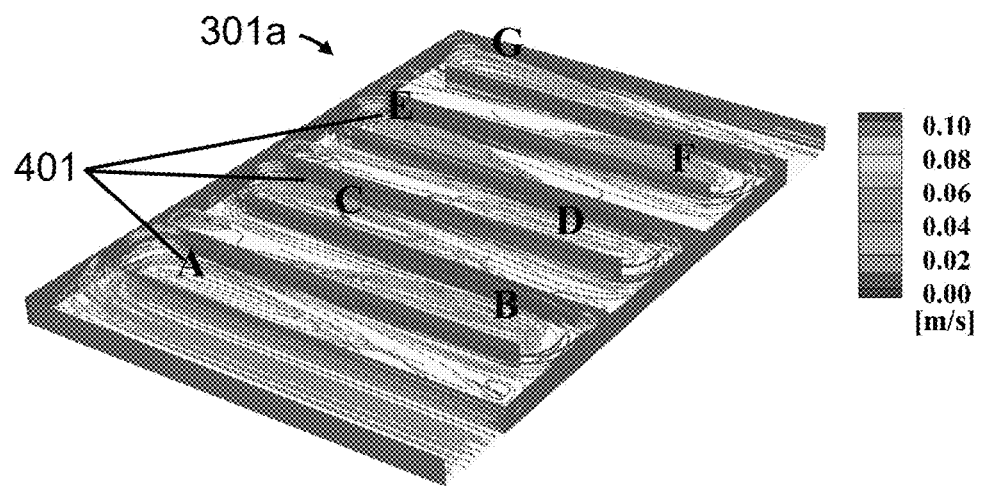
FIG. 4 is a perspective view of a computational fluid dynamics (CFD) solution for water and disinfectant flow within the rectangular disinfection reactor of FIG. 3B.

FIG. 4 is a perspective view of a CFD solution for water and disinfectant flow at a flow rate of 3 m³/s within rectangular disinfection reactor 301a, including fluid streamlines colored (e.g., shaded, if reproduced in black and white) by velocity (in meters per second (m/s)) (e.g., indicative of fluid flow path and velocity). As shown, fluid progresses smoothly through the first channel and accelerates as it flows around the first baffle through a narrow region defined in part by a large recirculation region 401 (e.g., location A). As shown, each channel induces such a recirculation region (e.g., locations B-G) in which fluid flows slowly. Fluid bypassing recirculation regions 401 travels more quickly, with velocities exceeding 0.1 m/s. From this simulation, it is evident that fluid volumes that take different paths through disinfection reactor 301a (e.g., and thus disinfection reactor 301) may have significantly different exposure times. For example, fluid volumes travelling through recirculation regions 401 may have a significantly longer residence time within the reactor than fluid volumes that bypass the recirculation regions. In order to define the flow characteristics and efficiency of rectangular reactor 301a, the residence time distribution for a volume of fluid entering the reactor may be determined and compared to the residence time distribution for an ideal plug flow reactor.

Figure 5:
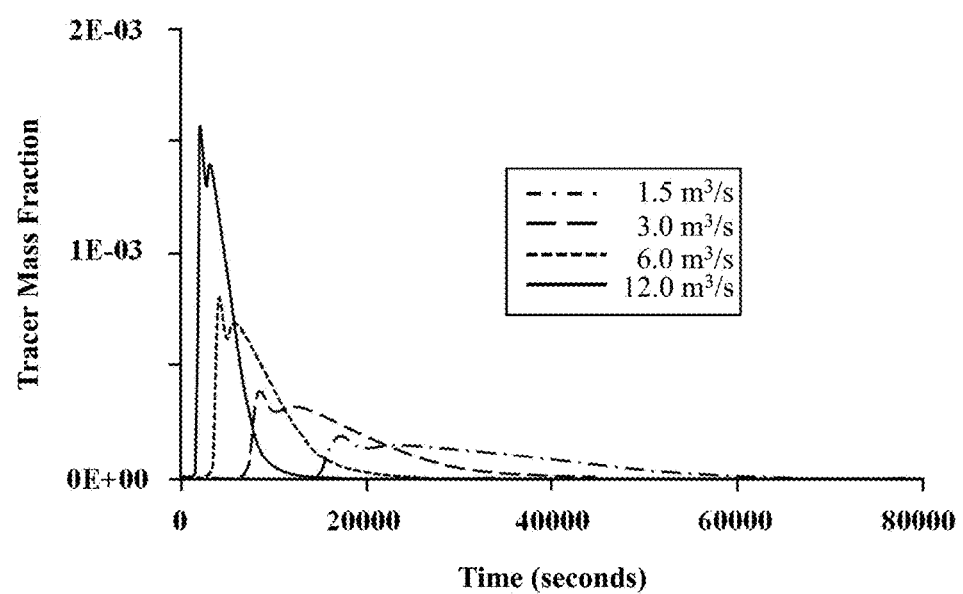
FIG. 5 is a graph showing the residence time for a tracer volume of fluid within the rectangular disinfection reactor of FIG. 3B at various flow rates.

Referring now to FIG. 5, a residence time distribution may be determined using the same Fluent model, as disclosed above. The following analyses reflect four (4) flow rates of 1.5, 3.0, 6.0, and 12.0 m³/s, chosen to correspond to the actual operation of rectangular reactor 301 (e.g., reactor 301 typically operates at flow rates of between 3.0 and 6.0 m³/s). The residence time distribution (e.g., FTC) for each flow rate is provided in FIG. 5. As shown, the FTC exhibits two peaks for each flow rate, the first peak being more prominent at higher flow rates. This first peak may be explained, in part, due to flow short-circuiting (e.g., volumes of fluid bypassing recirculation regions 401, as shown in FIG. 4). The second peak may be related to the distribution of the remainder of the tracer. As shown, as flow rate is decreased, the distribution curve spreads over a longer period of time. For example, as shown, the FTC for 1.5 m³/s indicates small portions of tracer mass exiting the reactor at times beyond 60,000 seconds (s), where the FTC for 12 m³/s indicates a majority of the tracer mass has exited the reactor at approximately 10,000 s. Both the first and second peaks tend to even out (e.g., become less prominent relative to the rest of the FTC) with decreasing flow rate. Such reduction of the peaks may be explained, in part, due to short-circuiting becoming less dominant at lower flow rates. As noted above, a plug flow reactor residence time distribution curve is a Dirac delta function, and has no width. From FIG. 5, it can be seen that flow in the prior art reactor is sub-optimal at each flow rate (e.g., the FTC for each flow rate has a significant width), particularly at lower flow rates.

TABLE 6

Rectangular Reactor Performance at Various Flow Rates

| | Flow rate | | | |
|---|---|---|---|---|
| | 1.5 | 3.0 | 6.0 | 12.0 |
| $\Theta_{10}$ | 0.542 | 0.540 | 0.536 | 0.534 |
| $\Theta_{25}$ | 0.684 | 0.682 | 0.671 | 0.666 |
| $\Theta_{75}$ | 1.267 | 1.243 | 1.182 | 1.144 |
| $\Theta_{90}$ | 1.642 | 1.579 | 1.441 | 1.354 |

TABLE 6 groups the dimensionless flow times obtained from each FTC. As shown, $\Theta_{10}$ and $\Theta_{25}$ do not vary much with flow rate. However, the change in $\Theta_{75}$ and $\Theta_{90}$ as flow rate increases is significant, with decreases of approximately 10% and 20% respectively for a flow rate increase from 1.5 m³/s to 12 m³/s. This may be a result of the smaller FTC spread observed for faster flows. These inefficiencies may be caused, in part, by the large recirculation regions 401 illustrated in FIG. 4. Such results indicate not only a risk of inadequate disinfection, but also of harmful BDP production.

5. Semi-Circular Disinfection Reactor

Figure 6:
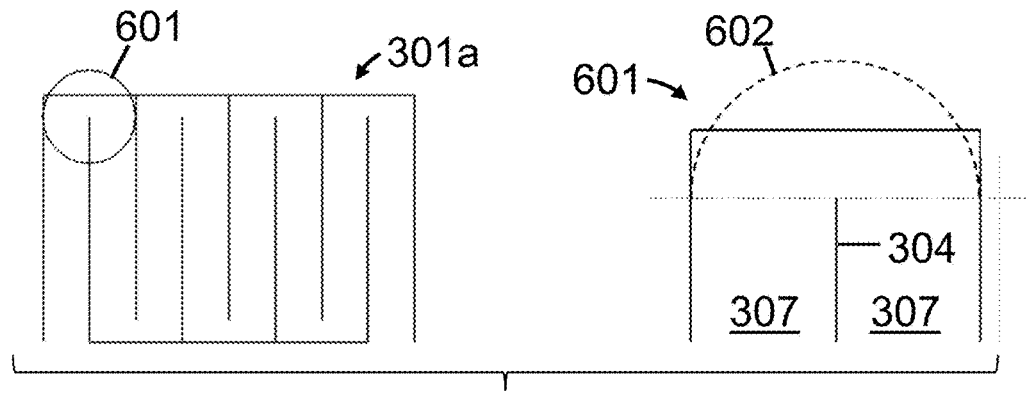
FIG. 6 is a top view of a design change which may be made to the rectangular disinfection reactor of FIG. 3A or 3B.
Figure 7A:
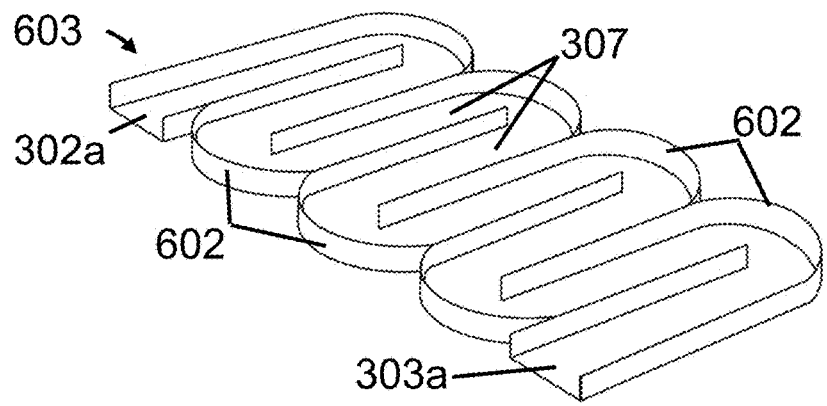
FIGS. 7A and 7B are a perspective view and a top view, respectively, of a semi-circular disinfection reactor.
Figure 7B:
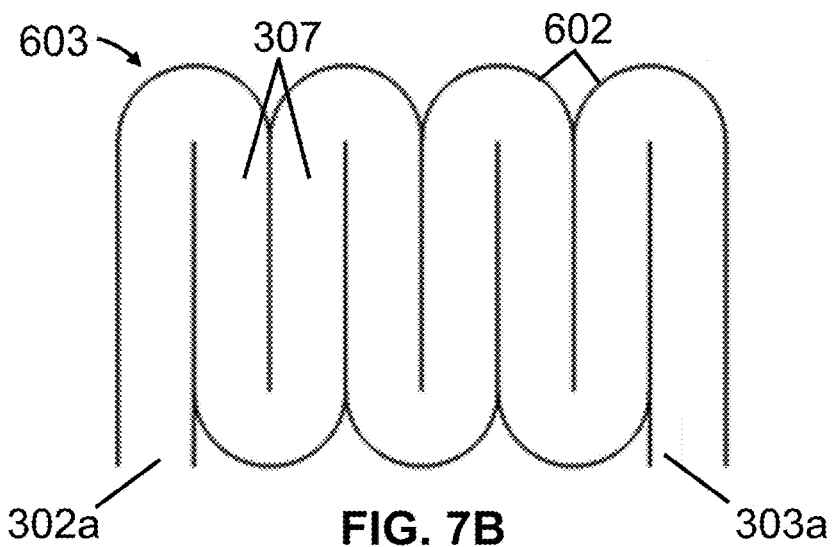

Referring now to FIG. 6, a semi-circular disinfection reactor can be defined by rounding (e.g., as shown) the fluid passageways (e.g., connecting channels 307) at locations 601 of right angles where the fluid flow reverses directions (e.g., by forming semi-circular walls 602 centered on the open end of baffles 304) (Fidaros, et al., 2007). Through the modifications of FIG. 6, a semi-circular disinfection reactor can be created. FIGS. 7A and 7B depict a perspective view and a top view, respectively, of such a semi-circular disinfection reactor 603. Reactor 603 has a working fluid volume of 47,000 m³ (e.g., the same order of magnitude as reactor 301a). Semi-circular walls 602 can reduce the size of recirculation regions (e.g., 401), which may otherwise be created and/or exacerbated by sharp direction changes (e.g., right angles) along the flow path (e.g., locations 601) by providing for smoother flow direction changes within the reactor. Other than the above noted differences, reactor 603 is substantially similar to reactor 301a.

Figure 8:
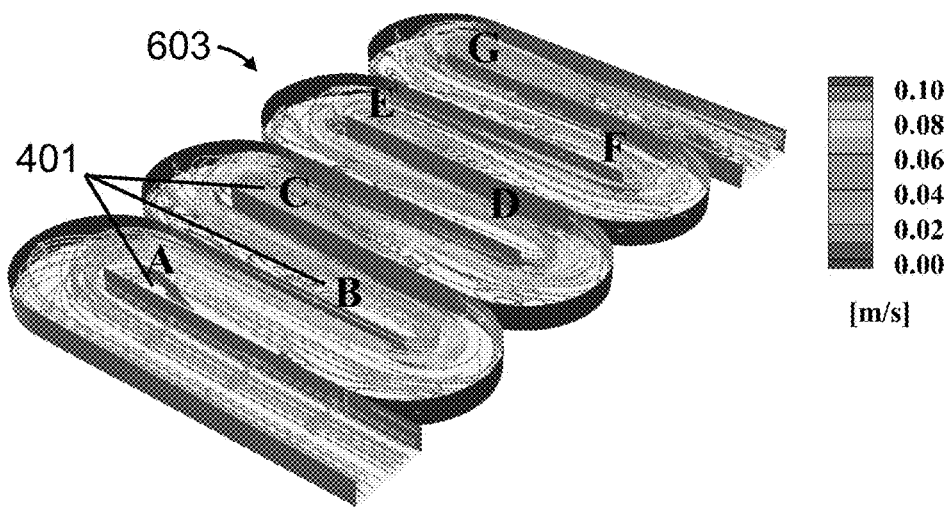
FIG. 8 is a perspective view of a CFD solution for water and disinfectant flow within the semi-circular disinfection reactor of FIGS. 7A and 7B.
Figure 9:
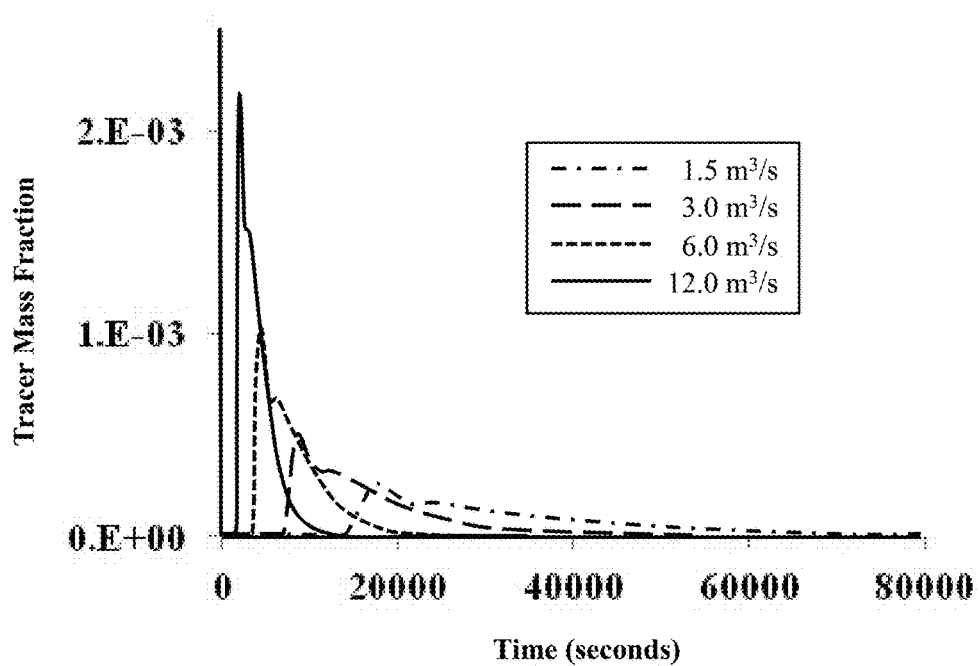
FIG. 9 is a graph showing the residence time for a tracer volume of fluid within the semi-circular disinfection reactor of FIGS. 7A and 7B at various flow rates.

FIG. 8 is a perspective view of a CFD solution for water and disinfectant flow at a flow rate of 3 m³/s within semi-circular disinfection reactor 603, including fluid streamlines colored (e.g., shaded, if reproduced in black and white) by velocity (in meters per second (m/s)) (e.g., indicative of fluid flow path and velocity). As shown, recirculation regions 401 (e.g., at locations A-G) have been reduced in size (e.g., compare FIG. 8 with FIG. 4), however, each channel 307 still contains relatively dominant recirculation regions (e.g., occupying a substantial portion of the channel). As shown and as with reactor 301a, portions of fluid flow within reactor 603 accelerate along baffle sidewalls (e.g., past recirculation regions 401), thus creating the potential for flow short-circuiting. The resulting residence time distribution (e.g., FTC) for each flow rate analyzed is provided in FIG. 9. As shown, the two peaks (e.g., similar to as described with reference to FIG. 5 for the rectangular reactor above) are nearly unitary (e.g., forming one peak) for reactor 603, which is indicative of a reduction in flow short-circuiting. The reduction in flow short-circuiting may be explained, in part, by the reduction of recirculation regions (e.g., FIG. 8 for the semi-circular disinfection reactor shows smaller recirculation regions 401 than FIG. 4 for the rectangular disinfection reactor).

TABLE 7

Semi-circular Reactor Performance at Various Flow Rates

| | Flow rate | | | |
|---|---|---|---|---|
| | 1.5 | 3.0 | 6.0 | 12.0 |
| $\Theta_{10}$ | 0.529 | 0.528 | 0.527 | 0.524 |
| $\Theta_{25}$ | 0.632 | 0.628 | 0.622 | 0.613 |
| $\Theta_{75}$ | 1.243 | 1.199 | 1.124 | 1.044 |
| $\Theta_{90}$ | 1.725 | 1.589 | 1.403 | 1.240 |

The performance characteristics for the semi-circular reactor are similar to those shown in TABLE 6 for the rectangular reactor. As shown, $\Theta_{10}$ and $\Theta_{25}$ do not vary much with flow rate, and $\Theta_{75}$ and $\Theta_{90}$ show increases of approximately 20% and 40%, respectively, when flow rate is reduced from 12 m³/s to 1.5 m³/s.

6. Circular Disinfection Reactor

Figure 10A:
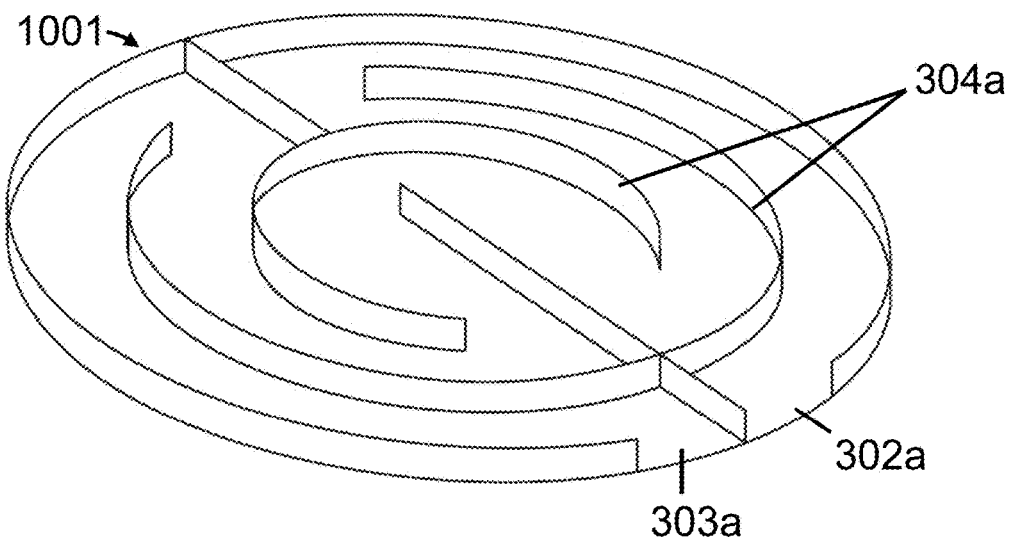
FIGS. 10A and 10B are a perspective view and a top view, respectively, of a circular disinfection reactor.
Figure 10B:
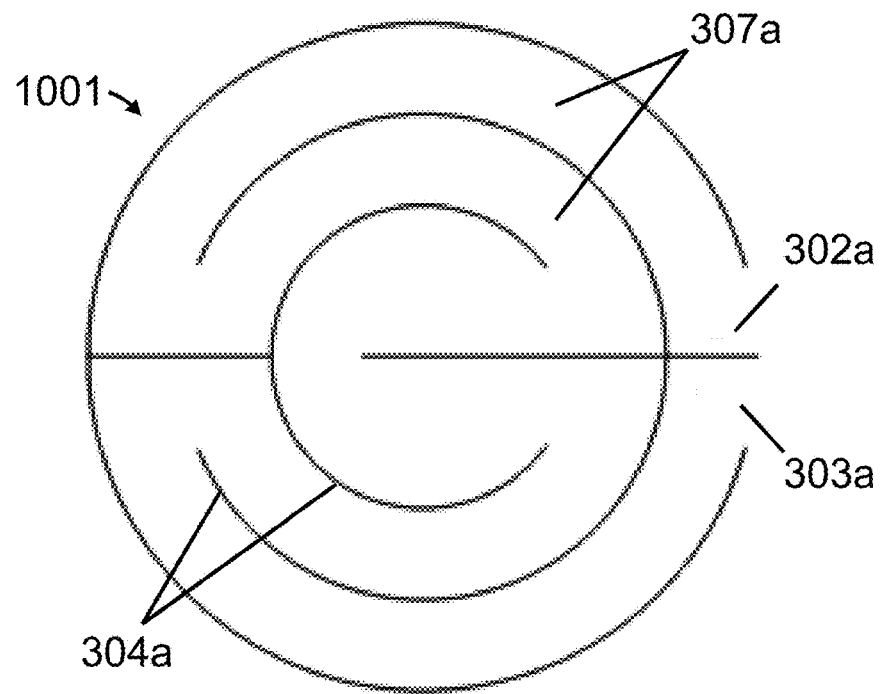

Referring now to FIGS. 10A and 10B, shown are perspective and top views, respectively, of a circular disinfection reactor 1001 (Fidaros, et al., 2007). As shown, inlet 302a is adjacent to outlet 303a. Interior sidewalls 304a (e.g., serving a substantially similar function to baffles 304 in other disinfection reactors, for example, reactor 301a) are such that channels 307a maintain a constant width along the flow path (excepting the interior most channels). The total working water volume of reactor 1001 is 49,260 m³, which corresponds to a water height of 5 m.

Figure 11:
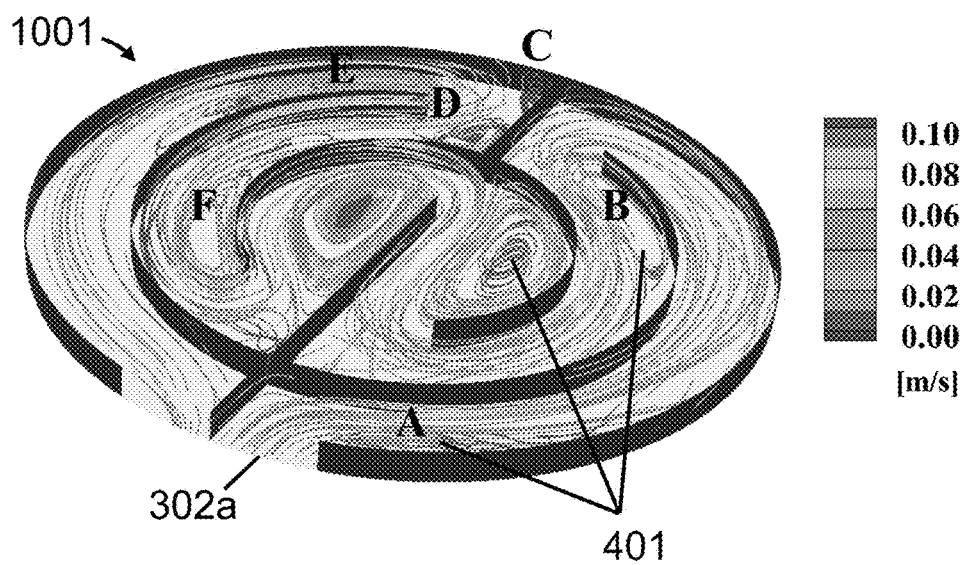
FIG. 11 is a perspective view of a CFD solution for water and disinfectant flow within the circular disinfection reactor of FIGS. 10A and 10B.
Figure 12:
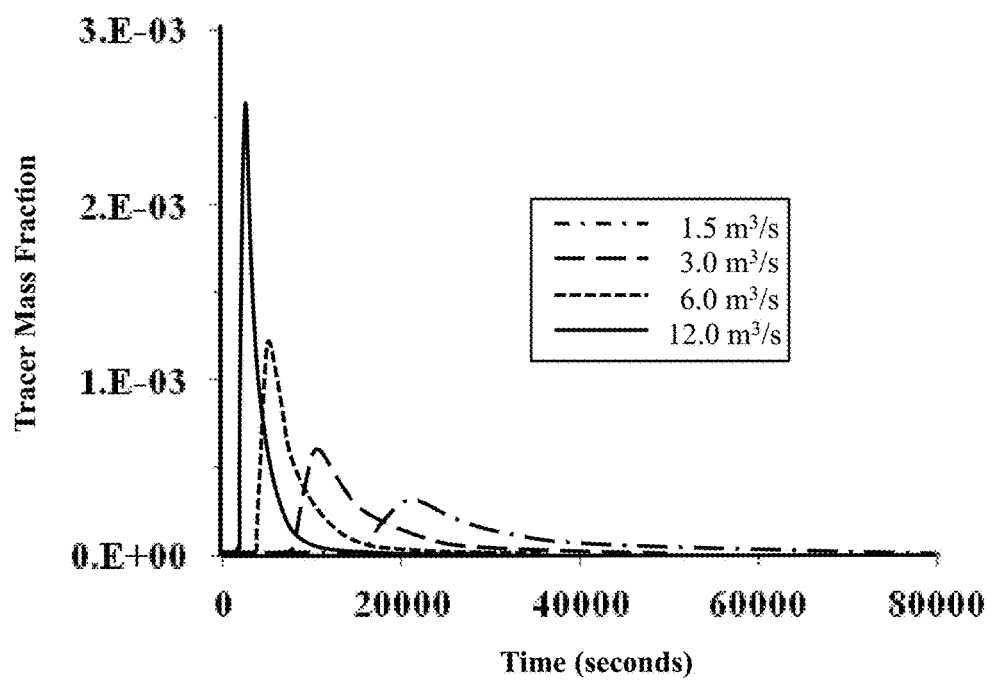
FIG. 12 is a graph showing the residence time for a tracer volume of fluid within the circular disinfection reactor of FIGS. 10A and 10B at various flow rates.

FIG. 11 is a perspective view of a CFD solution for water and disinfectant flow at a flow rate of 3 m³/s within reactor 1001, including fluid streamlines colored (e.g., shaded, if reproduced in black and white) by velocity (in meters per second (m/s)) (e.g., indicative of fluid flow path and velocity). Despite the relatively large inlet 302a, a recirculation region 401 forms in the flow adjacent to the inlet (e.g., at location A). Further recirculation regions 401 are formed at each direction change (e.g., at locations B-G) and at the center of the disinfection reactor. As shown, and as with the reactors described above, flow moving past the recirculation regions moves relatively quickly (e.g., along the walls of the reactor), which may result in flow short circuiting (e.g., fluid volumes moving past the recirculation region move through the reactor more quickly than fluid volumes travelling within the recirculation regions). Therefore, as with other reactors described above, the flow characteristics are sub-optimal, and recirculation regions result in significant deviations from plug flow. The resulting residence time distributions (e.g., FTCs) for each flow rate are provided in FIG. 12. As shown, the FTCs suggest a combination of plug flow (e.g., a relatively sharp peak resembling a Dirac delta function, particularly for higher flow rates) and mixed flow (e.g., the FTCs still exhibit a significant width) (Levenspiel, 1999). As flow rate decreases, dispersion becomes more significant (e.g., the FTC is spread over a longer period of time for lower flow rates).

TABLE 8

Circular Reactor Performance at Various Flow Rates

| | Flow rate | | | |
|---|---|---|---|---|
| | 1.5 | 3.0 | 6.0 | 12.0 |
| $\Theta_{10}$ | 0.578 | 0.583 | 0.578 | 0.568 |
| $\Theta_{25}$ | 0.661 | 0.661 | 0.655 | 0.646 |

TABLE 8-continued

Circular Reactor Performance at Various Flow Rates

| | Flow rate | | | |
|---|---|---|---|---|
| | 1.5 | 3.0 | 6.0 | 12.0 |
| $\Theta_{75}$ | 1.112 | 1.079 | 1.025 | 0.958 |
| $\Theta_{90}$ | 1.500 | 1.412 | 1.285 | 1.149 |

As shown in TABLE 8, $\Theta_{10}$, $\Theta_{25}$, and $\Theta_{75}$ vary only slightly with flow rate (which constitutes an improvement over the rectangular reactor and the semi-circular reactor). However, for $\Theta_{90}$, there is an approximately 30% increase corresponding to a flow rate decrease from 12 m³/s to 1.5 m³/s, which may be a result of the increased width of the FTC at lower flow rates.

7. Spiral-shaped Disinfection Reactors

As described above, smoothing of flow corners can result in improvement to flow behavior within the reactor (e.g., in general, each subsequent reactor described above has more desirable flow characteristics than each preceding reactor). Such smooth corners can result in reductions in recirculation regions and thus bring flow behavior closer to plug flow (e.g., by at least reducing flow short-circuiting). From the forgoing, the inventors conclude that an ideal design may comprise minimal corners and a lack of traditional baffles (e.g., a spiral-shaped disinfection reactor).

Figure 13A:
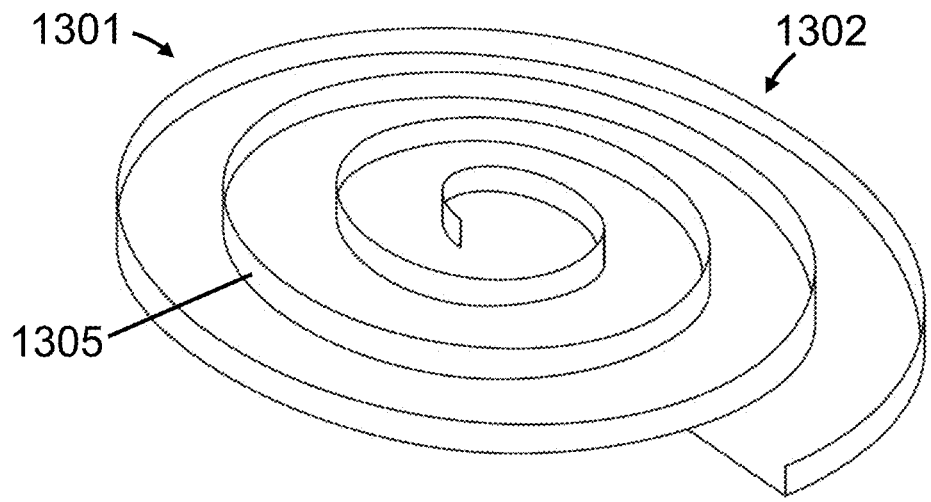
FIGS. 13A and 13B are a perspective view and a top view, respectively, of one embodiment of the present spiral-shaped disinfection reactors.
Figure 13B:
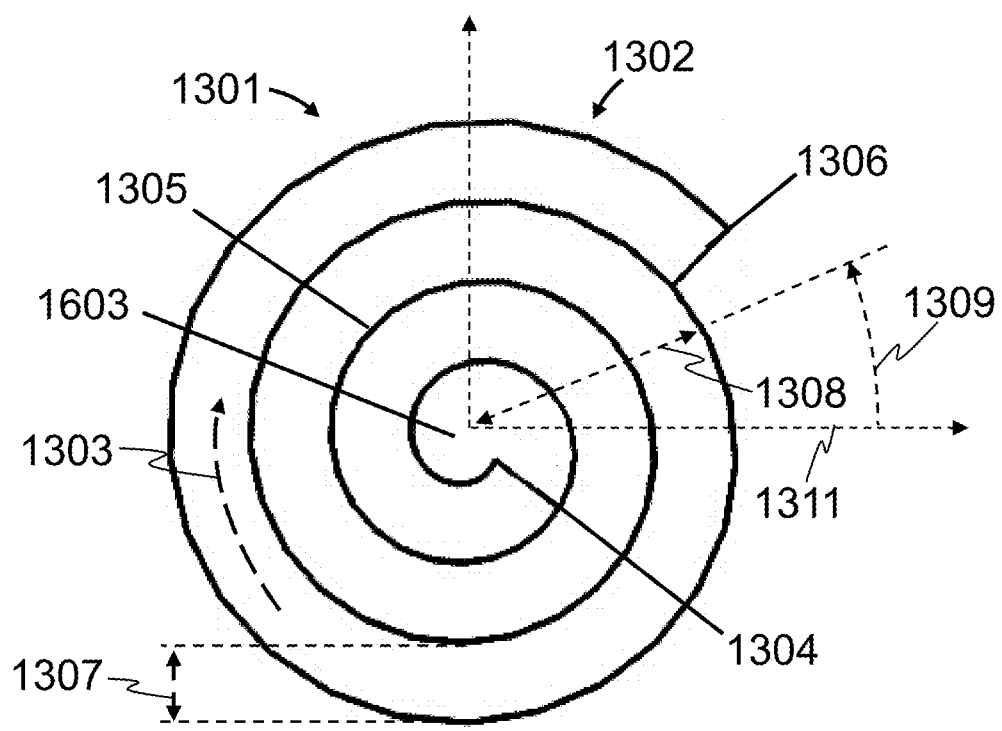

Referring now to FIGS. 13A and 13B, shown are a perspective view and a top view, respectively, of one embodiment 1301 of the present spiral-shaped disinfection reactors. In the embodiment shown, reactor 1301 includes a body 1302 that defines a spiral flow path 1303 between an inlet (e.g., opening) 1304 and an outlet (e.g., opening) 1306. In some embodiments (e.g., 1301), spiral flow path 1303 may have the shape of a spiral in that a radius of curvature of the spiral flow path increases along the spiral flow path (e.g., from opening 1304 to opening 1306). In this embodiment, reactor 1301 is configured such that water and disinfectant entering inlet 1304 are exposed to one another as they flow through spiral flow path 1303. In the depicted embodiment, flow path 1303 has a width 1307 and a length of 704 m. In some embodiments, the present spiral-shaped disinfection reactors may be configured to have a smaller size (e.g., having less total surface area, due in part to the circular-like shape) than a traditional reactor (e.g., as in FIG. 3A), yet having a similar capacity.

In the embodiment shown, spiral flow path 1303 is substantially planar. For example, in this embodiment, no portion of spiral flow path 1303 overlies any other portion of the spiral flow path. In the depicted embodiment, body 1302 comprises a sidewall 1305 disposed between adjacent portions of spiral flow path 1303. In the embodiment shown, sidewall 1305 has a length that is substantially equal to the length of spiral flow path 1303.

Inlet 1304, in this embodiment, is located on the inside or in an interior region of the spiral, but, in other embodiments, may be located on the exterior or on an exterior portion of the spiral (e.g., in a location such as that of outlet 1306) and the outlet may be located in the interior of the spiral (e.g., in a location similar to that of inlet 1304). In the depicted embodiment, inlet 1304 and outlet 1306 each comprise a single opening. However, in other embodiments the inlet and/or the outlet may each comprise a plurality of openings (e.g., each of the plurality of openings lying in a plane of the inlet and/or outlet, respectively).

In the embodiment shown, spiral flow path 1303 is configured such that width 1307 remains substantially constant along the length of the spiral flow path (e.g., extending from inlet 1304 to outlet 1306, as shown). However, in other embodiments, spiral flow paths (e.g., 1303) of the present spiral-shaped disinfection reactors may be configured in other separate or additional ways or to accomplish different or additional purposes. For example, in some embodiments, a spiral flow path (e.g., 1303) is configured as an Archimedean spiral. In some embodiments, an arc length (e.g., 1308) of the spiral flow path is substantially defined as a function of an angle α (e.g., 1309) such that:

$$S(\alpha) = \frac{1}{2}a\left(\alpha\sqrt{1+\alpha^2} + \ln\left(\alpha + \sqrt{1+\alpha^2}\right)\right) \quad (21)$$

where S is the arc length, α is the angle, and a is a constant indicative of the distance between adjacent spiral arms (Weisstein). In these and similar embodiments, a width (e.g., 1307) of the flow path may be set by adjusting the constant a. For example, a flow path width (e.g., 1307) (e.g., a distance between adjacent spiral arms) can be set to match a channel width of a traditional reactor (e.g., 16 m, such as, for example, in the rectangular reactor of FIG. 3A). As defined by EQ. 21, a radius of the spiral will increase by the constant a every 2π rotation. Therefore, in embodiments in which a flow path width (e.g., 1307) is set to match a channel width of a traditional reactor, the constant a can be defined as the channel width of the traditional reactor divided by 2π (e.g., for a channel width of 16 m, the constant a would be approximately 2.5 m). In such embodiments, the flow path length may be substantially equal to the length of a flow path of a traditional disinfection reactor (e.g., the reactor of FIG. 3A). For example, the total arc length (e.g., corresponding to flow path 1303 length) can be limited to the flow path length of a traditional reactor. To illustrate, in order to substantially equal the flow path length of the reactor of FIG. 3A (e.g., approximately 700 m), α can be 23.64 radians (e.g., over two and a half revolutions), resulting in a total arc length of approximately 704 m. Some embodiments of the present spiral-shaped disinfection reactors (e.g., reactor 1301) can have a total working water volume of approximately 49,800 m³ (e.g., corresponding to a water height of 5 m) (e.g., a similar total working water volume to that of reactor 301). In embodiments in which a spiral flow path (e.g., 1303) is substantially described by EQ. 21, a center of the spiral can be removed in order to avoid large curvatures near the center of the spiral (e.g., the spiral defined by arc length 1308 in reactor 1301 does not reach the origin of axes 1311).

Figure 14:
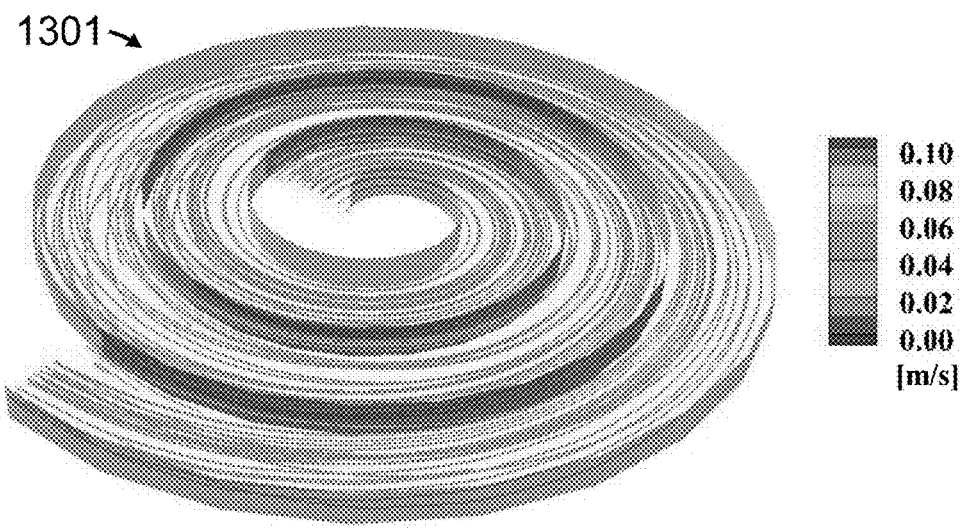
FIG. 14 is a perspective view of a CFD solution for water and disinfectant flow within the spiral-shaped disinfection reactor of FIGS. 13A and 13B.

In some embodiments, such as the one shown, spiral flow path 1303 is configured to reduce recirculation regions in the flow of water and disinfectant through the flow path. FIG. 14, for example, shows a perspective view of a CFD solution for water and disinfectant flow at a flow rate of 3 m³/s within reactor 1301, including fluid streamlines (e.g., shaded, if reproduced in black and white) by velocity (in meters per second (m/s)) (e.g., indicative of fluid flow path and velocity) in which the flow path 1303 is configured to minimize recirculation regions. As shown in FIG. 14, in this embodiment, the fluid velocity streamlines are smooth and there is a near if not total absence of recirculation regions. In these embodiments, the recirculation regions are minimized and/or eliminated by at least the elimination of sudden changes in flow direction. As shown, in this embodiment, the average velocity along spiral flow path 1303 is approximately 0.5 m/s.

In some embodiments, such as reactor 1301 shown in FIGS. 13A and 13B, the reactor is configured such that the disinfectant exposure time for water and disinfectant flow through the reactor is substantially uniform across a range of flow rates through the spiral flow path 1303. For example, embodiments of the present reactors can be configured such that a known volume of tracer inserted at the inlet 1304 takes a time, $t_{10}$, for 10% of the tracer flow volume to pass the reactor outlet 1306 and a time, $t_{90}$, for 90% of the tracer volume to pass the reactor outlet 1306, and such that the ratio of $t_{90}/t_{10}$ is between 1 and 1.4 for water flow rates in an expected operating range (e.g, approximately 1 to 12 m$^3$/s) for the reactor. For further example, embodiments of the present reactors may be configured to encourage flow approximating plug flow at a specific flow rate (e.g., the embodiment shown in FIG. 14 at approximately 3 m$^3$/s), or over a range of flow rates (e.g., approximately 1 to 12 m$^3$/s). The present reactors may also be configured to avoid flow short-circuiting through at least the elimination of recirculation regions in the flow.

In some embodiments, flow rate and spiral path geometry may be configured to inactivate as many microorganisms as possible without forming harmful by-products. For example, the geometry may be configured to reduce recirculation regions in the flow, to encourage flow approximating plug flow, or to avoid flow short-circuiting in order to provide a consistent exposure time between the water and disinfectant in the flow path (e.g. the embodiment shown in FIGS. 13A and 13B).

Figure 15:
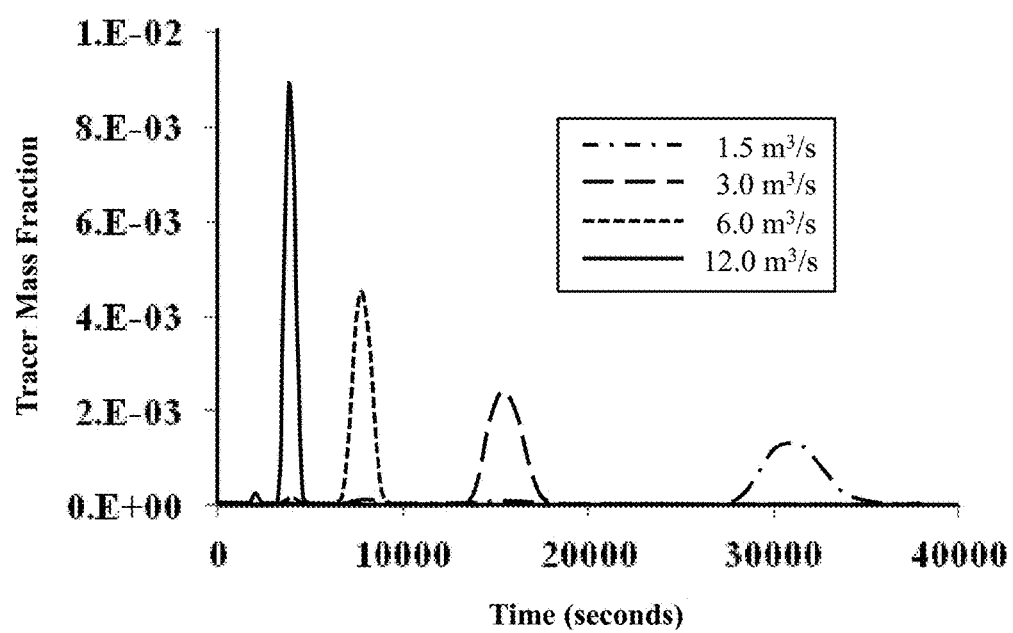
FIG. 15 is a graph showing the residence time for a tracer volume of fluid within the spiral-shaped disinfection reactor of FIGS. 13A and 13B at various flow rates.

FIG. 15 is a graph showing the residence time distribution (e.g., FTC) for a tracer volume of fluid at various flow rates within spiral-shaped reactor 1301 of FIGS. 13A and 13B. For each flow rate shown, the FTC is a nearly symmetrical distribution with a single peak, which is indicative of at least an absence of flow short-circuiting. Additionally, at high flow rates (e.g., 12 m$^3$/s), the distribution is narrow, resembling a Dirac delta plug flow FTC (e.g., resembling and/or approximating plug flow).

TABLE 9

Spiral-shaped Reactor Performance at Various Flow Rates

| | Flow rate | | | |
|---|---|---|---|---|
| | 1.5 | 3.0 | 6.0 | 12.0 |
| $\Theta_{10}$ | 0.875 | 0.869 | 0.859 | 0.849 |
| $\Theta_{25}$ | 0.900 | 0.896 | 0.890 | 0.882 |
| $\Theta_{75}$ | 0.960 | 0.961 | 0.959 | 0.904 |
| $\Theta_{90}$ | 0.986 | 0.986 | 0.983 | 0.953 |

As shown in TABLE 9, each dimensionless time (e.g., $\Theta_{10}$, $\Theta_{25}$, $\Theta_{75}$, and $\Theta_{90}$) remains substantially independent of flow rate, even for the highest flow rate shown of 12.0 m$^3$/s, and each value indicates encouragement of plug flow (e.g., a value of 1). These values may be indicative of the substantial reduction and/or elimination of recirculation regions in the reactor (e.g., and a corresponding reduction and/or elimination of flow short-circuiting). In approximating plug flow, this embodiment of the present spiral-shaped reactors is able to help ensure adequate disinfection of water, while minimizing harmful DBP production.

Figure 16:
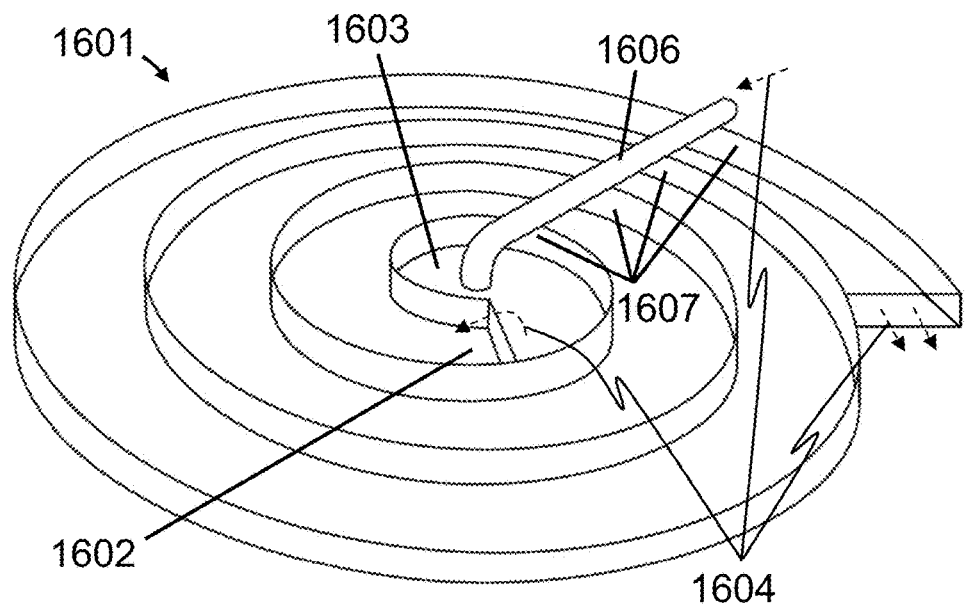
FIG. 16 is a perspective view of one embodiment of the present spiral-shaped disinfection reactors comprising a mixing tank.

FIG. 16 depicts another embodiment 1601 of the present spiral-shaped disinfection reactors. Reactor 1601 is substantially similar to reactor 1301, with the primary exception that inlet 1602 of reactor 1601 is coupled to a mixing chamber 1603 (e.g, location also indicated in FIG. 13B). As shown, arrows 1604 indicate the direction of flow into mixing chamber 1603 and through reactor 1601. In other embodiments, flow may be in the opposite direction and the mixing chamber may be located on an exterior portion of the reactor (e.g. at and/or near the location of outlet 1306 in FIG. 13B). In some embodiments, such as the one shown, mixing chamber 1603 can be configured to overflow and thereby discharge into inlet 1602. In the embodiment shown, a pipe 1606 is configured to deliver water and/or disinfectant into mixing chamber 1603, and thereby into reactor 1601. In some embodiments, pipe 1606 is structurally supported by walls 1607 of the reactor (e.g., pipe 1606 is located substantially above reactor 1601); however, in other embodiments, pipe 1606 can be located substantially underneath reactor 1601 (e.g., and be configured to feed mixing chamber 1603 from below).

Figure 3B:
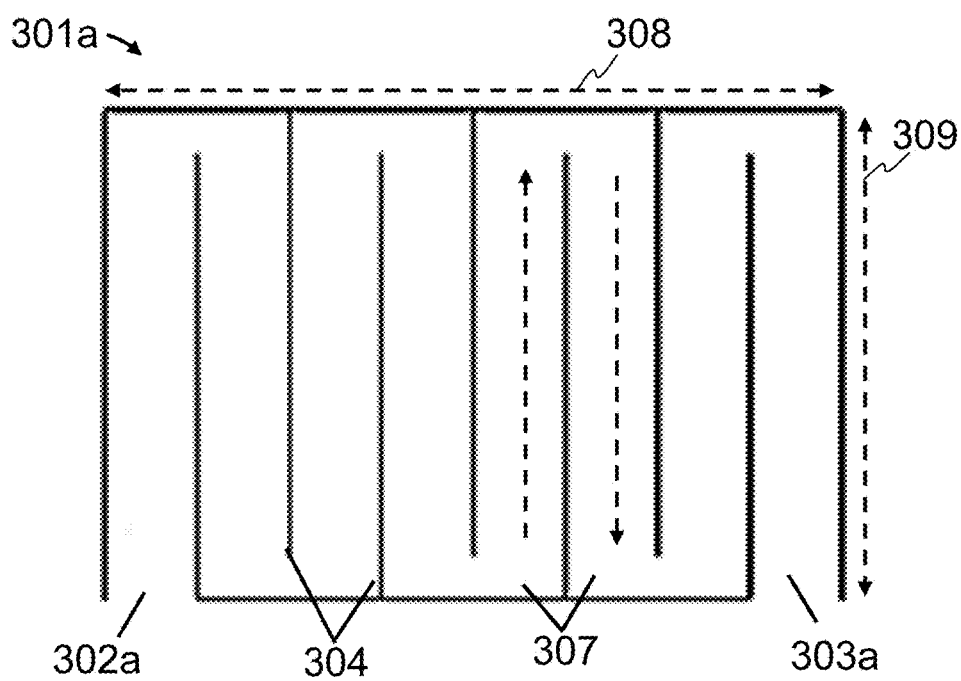
FIG. 3B is a top view of a model of the rectangular disinfection reactor of FIG. 3A.
Figure 17:
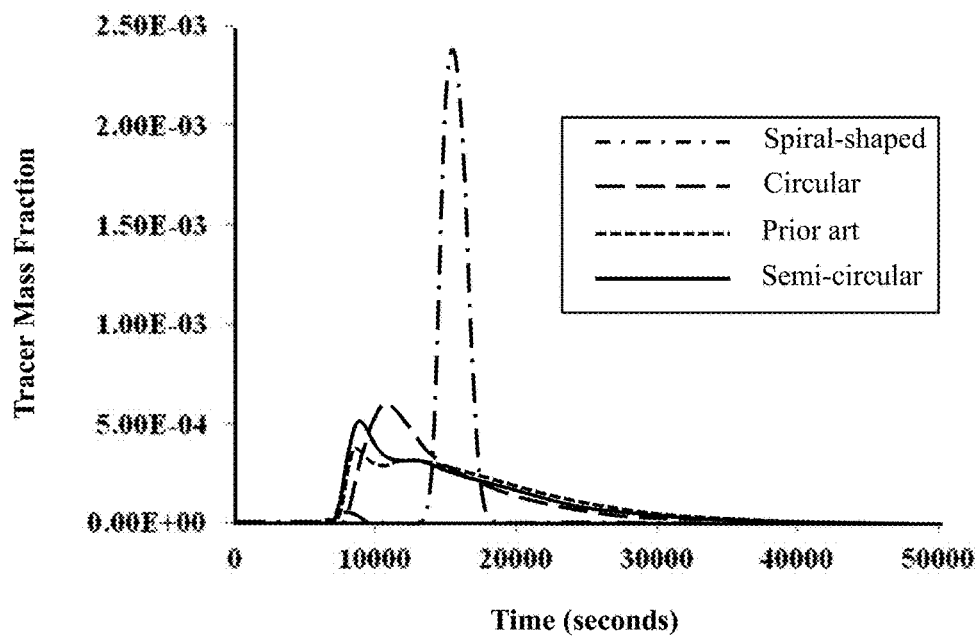
FIG. 17 is a graph showing the residence time for a volume of fluid within the rectangular disinfection reactor of FIG. 3B, the semi-circular disinfection reactor of FIGS. 7A and 7B, the circular disinfection reactor of FIGS. 10A and 10B, and the spiral-shaped disinfection reactor of FIGS. 13A and 13B at one flow rate.

FIGS. 17-21 are graphs showing flow characteristics for the rectangular disinfection reactor of FIG. 3B, the semi-circular disinfection reactor of FIGS. 7A and 7B, the circular disinfection reactor of FIGS. 10A and 10B, and the spiral-shaped disinfection reactor of FIGS. 13A and 13B (hereinafter "the reactors"). FIG. 17 is a graph showing the residence time distribution (e.g., FTC) for a tracer volume of fluid within the reactors at a flow rate of 3 m$^3$/s. As shown, the rectangular, semi-circular, and circular reactors exhibit similar FTCs, with amounts of tracer exiting at relatively long times from insertion (e.g., FTCs having substantial widths). However, the FTC for the spiral-shaped reactor shows a later appearance of tracer volume (e.g., minimal flow short-circuiting) with a well-defined peak (e.g., resembling and/or approximating plug flow). Therefore, disinfectant doses within the present spiral-shaped reactors (e.g., 1301) can be more precisely defined (e.g., the CT value) as opposed to within other reactors (e.g., flow within reactor 1301 travels through the reactor in a relatively uniform amount of time and thus disinfectant exposure is substantially uniform for any given volume of fluid across a range of flow rates). Through such features, less disinfectant can be required and harmful BDP production can be minimized.

Figure 18:
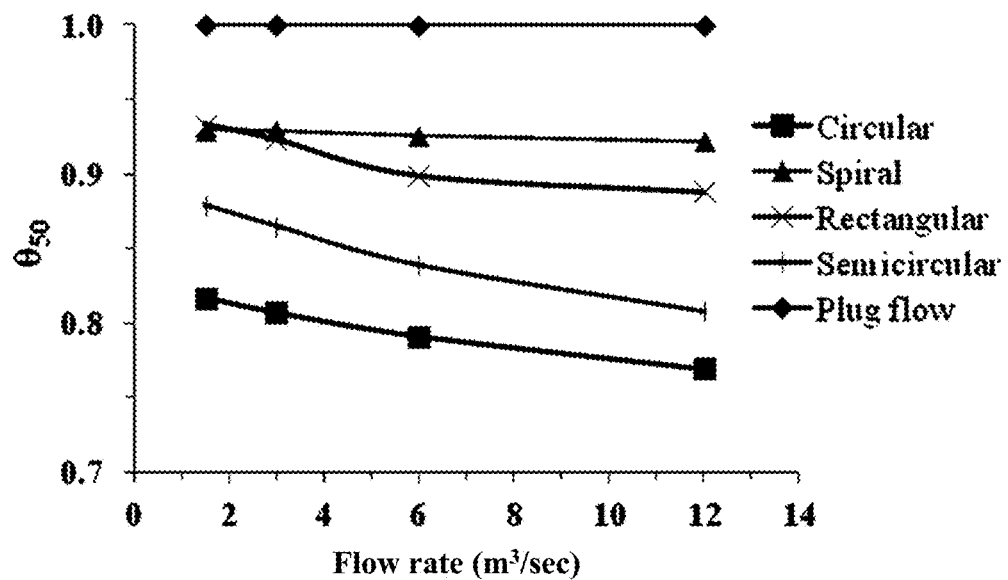
FIG. 18 is a graph indicative of the efficiency of the rectangular disinfection reactor of FIG. 3B, the semi-circular disinfection reactor of FIGS. 7A and 7B, the circular disinfection reactor of FIGS. 10A and 10B, and the spiral-shaped disinfection reactor of FIGS. 13A and 13B at various flow rates.

FIG. 18 is a graph representing the efficiency (e.g., $\Theta_{50}$) characteristics of the reactors at various flow rates. For the spiral-shaped reactor, $\Theta_{75}$–$\Theta_{25}$ is much closer to that of an ideal plug flow reactor (e.g., relative to the other reactors), while the rectangular reactor has mixing and dispersion characteristics that significantly deviate from those of an ideal plug flow reactor. As described above, $\Theta_{50}$ represents the dimensionless time at which half of the total tracer mass exits the reactor, with a plug flow reactor having a $\Theta_{50}$ value of 1. At low flow rates, the circular and semi-circular reactors exhibit a relatively low efficiency. As flow rate increases, the efficiency of the spiral-shaped reactor remains relatively constant, while the other reactors show a significant decrease in efficiency. As shown, the spiral-shaped reactor maintains a $\Theta_{50}$ value above 0.9, even for the highest flow rate tested of 12 m$^3$/s.

Figure 19:
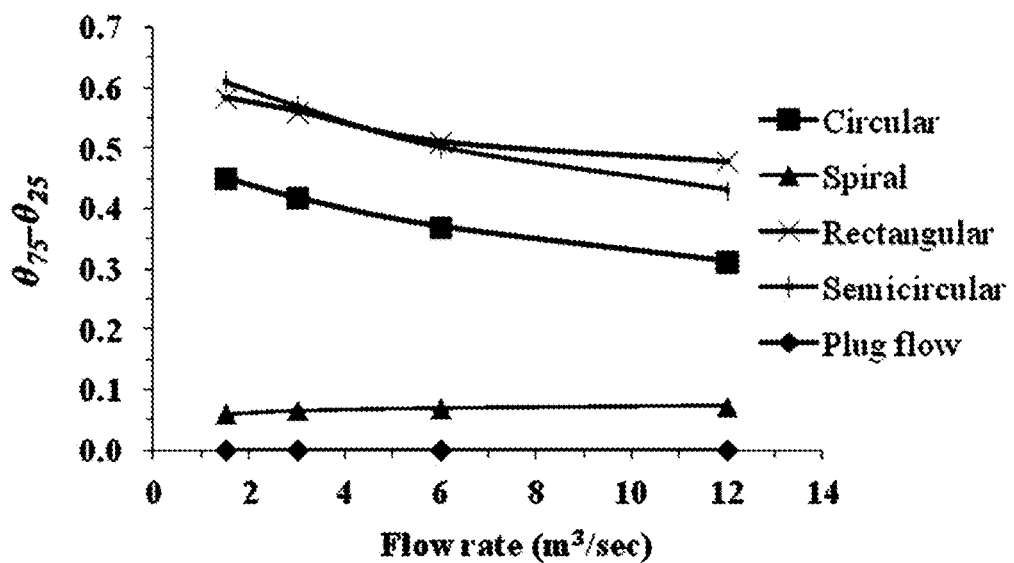
FIGS. 19 and 20 are graphs indicative of the mixing and dispersion characteristics of the rectangular disinfection reactor of FIG. 3B, the semi-circular disinfection reactor of FIGS. 7A and 7B, the circular disinfection reactor of FIGS. 10A and 10B, and the spiral-shaped disinfection reactor of FIGS. 13A and 13B at various flow rates.
Figure 20:
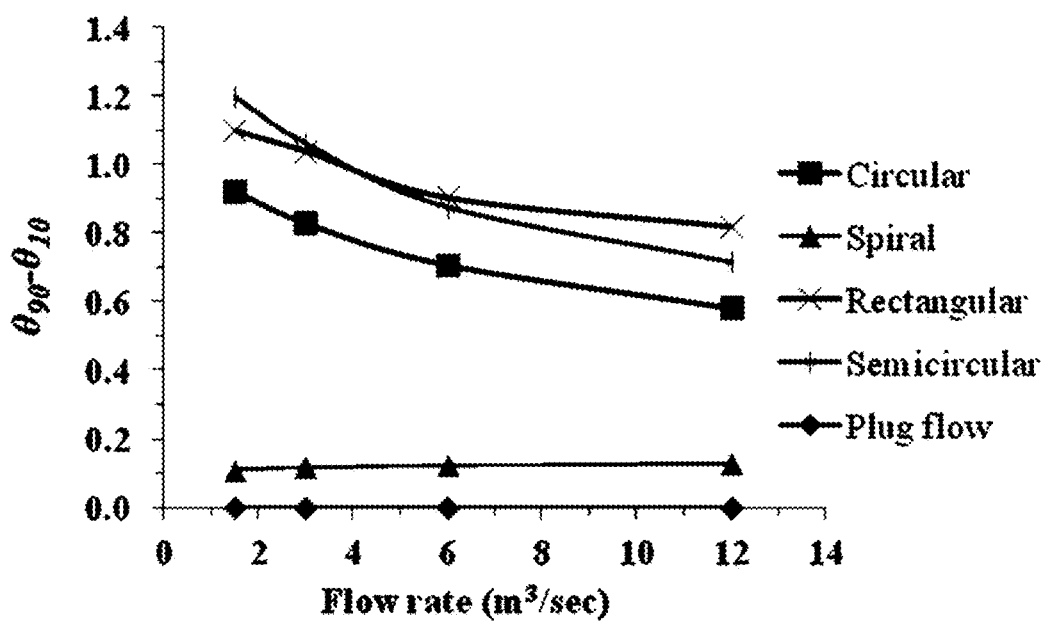

FIGS. 19 and 20 are graphs representing the mixing and dispersion characteristics of the reactors at various flow rates. As shown, the spiral-shaped reactor approximates plug flow at all flow rates, with a $\Theta_{75}$–$\Theta_{25}$ value of less than 0.1. The other reactors exhibit a $\Theta_{75}$–$\Theta_{25}$ value of greater than 0.3 for all flow rates. FIG. 20 further illustrates benefits of the spiral-shaped reactor over the prior art reactor similar to those illustrated in FIG. 19 (e.g., $\Theta_{90}$–$\Theta_{10}$ is also an indicator of mixing and dispersion characteristics).

Figure 21:
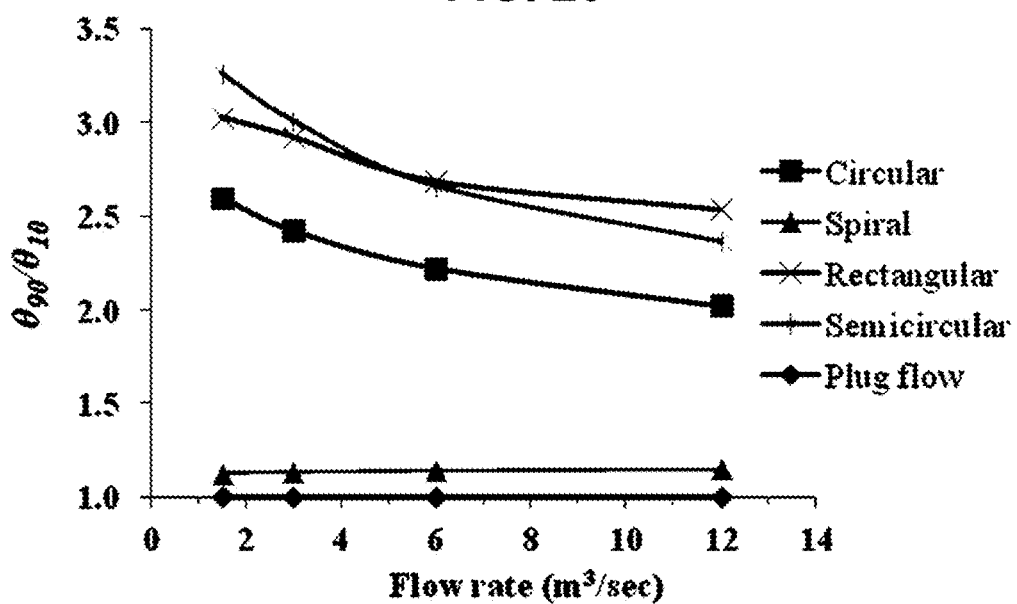
FIG. 21 is a graph of the Morril index of the rectangular disinfection reactor of FIG. 3B, the semi-circular disinfection reactor of FIGS. 7A and 7B, the circular disinfection reactor of FIGS. 10A and 10B, and the spiral-shaped disinfection reactor of FIGS. 13A and 13B at various flow rates.

FIG. 21 shows the Morrill index (ratio between $\Theta_{90}$ and $\Theta_{10}$) (e.g., another measure of reactor efficiency) for the reactors at various flow rates. As shown, spiral-shaped reactor 1301 maintains a nearly constant Morril index, almost independent from flow rate, and well within the range of 1 to 1.4 across a range of flow rates (e.g., from 3 m³/s to 12 m³/s). The other reactors, however, have a significantly higher Morril index (e.g., indicating a lower efficiency) than the ideal plug flow reactor, which has a Morril index of 1.

Figure 22:
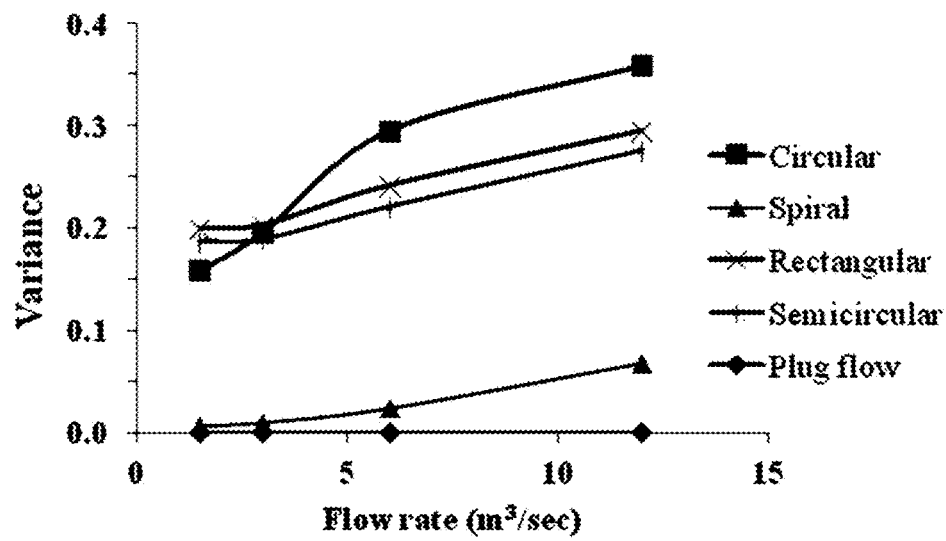
FIG. 22 is a graph of the flow variance of the rectangular disinfection reactor of FIG. 3B, the semi-circular disinfection reactor of FIGS. 7A and 7B, the circular disinfection reactor of FIGS. 10A and 10B, and the spiral-shaped disinfection reactor of FIGS. 13A and 13B at various flow rates.

FIG. 22 is a graph showing the spread of the flow through curve (FTC) for the reactors at various flow rates. The plug flow reactor has zero variance for all flow rates because the FTC curve in an ideal plug flow reactor has no spread (e.g., a Dirac delta function). As compared with the other reactors tested (e.g., which exhibit a relatively large variance that increases with flow rate), spiral-shaped reactor 1301 approximates plug flow at lower flow rates (e.g., nearly a zero variance) and has a relatively small variance for higher flow rates (e.g., well below 0.1 for all flow rates shown).

8. Spiral-Shaped Disinfection Reactor Size Reduction

Figure 23:
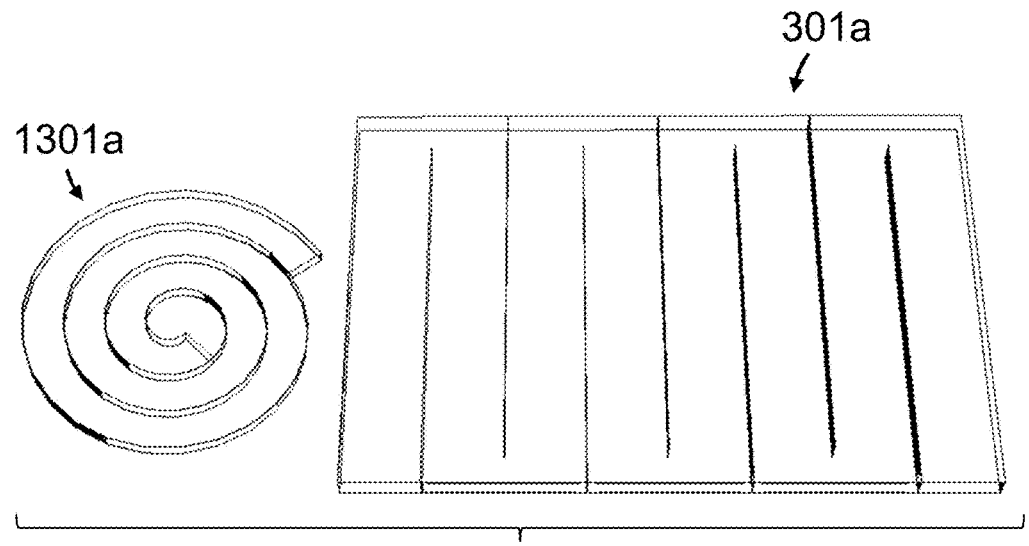
FIG. 23 depicts a perspective view of one embodiment of the present spiral-shaped disinfection reactors having a reduced size and a perspective view of the rectangular disinfection reactor of FIG. 3B.
Figure 24:
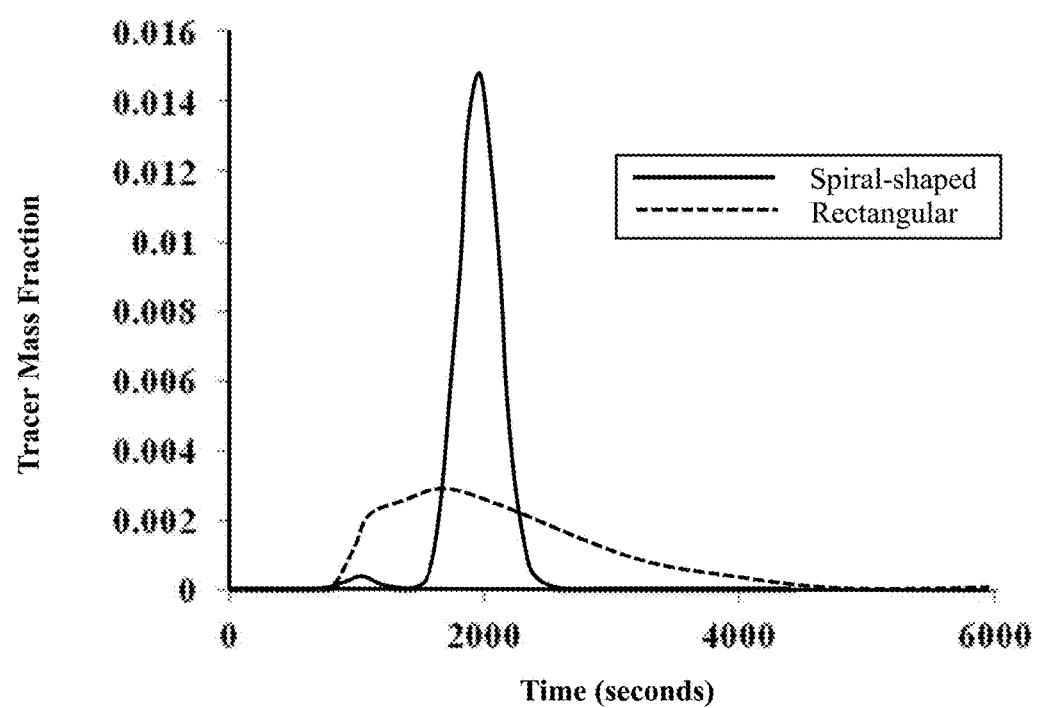
FIG. 24 is a graph showing the residence time for a tracer volume of fluid within the reduced-size spiral-shaped disinfection reactor of FIG. 23 and the rectangular disinfection reactor of FIG. 3B.

Smaller reactors may be desirable, particularly in areas where land is expensive. In order to further illustrate the advantages of the present spiral-shaped disinfection reactors, size reduction can be considered. For example, and as shown above, the present spiral-shaped disinfection reactors exhibit flow behavior that approximates plug flow. To illustrate, even at the highest flow rate tested of 12 m³/s, tracer fluid within spiral shaped reactor 1301 stayed group, and the tracer peak appeared at approximately 60 minutes (e.g., as shown in FIG. 15). Sixty minutes is well above the 15 minutes usually required for disinfection (Kothandaraman, 1974), and therefore certain embodiments of the present spiral-shaped disinfection reactors may be suitable for size reduction (e.g., spiral-shaped reactor 1301). Therefore, in some embodiments, the present spiral-shaped disinfection reactors may be configured to have a smaller size than a traditional reactor (e.g., with a corresponding decrease in volume). To illustrate, a 50% reduction in size (e.g., in substantially all dimensions) can be performed on both rectangular disinfection reactor 301a of FIG. 3B and spiral-shaped disinfection reactor 1301 of FIGS. 13A and 13B. FIG. 23 is a perspective view of a 50% smaller spiral-shaped reactor 1301a (e.g., 50% smaller than spiral-shaped reactor 1301) next to rectangular reactor 301a (full size) to illustrate the size decrease. The tank surface of reactor 1301a has been reduced by a factor of approximately 4.7 relative to spiral-shaped reactor 1301. FIG. 24 is a graph showing the residence time distribution (e.g., FTC) for a tracer volume of fluid at a flow rate of 3 m³/s within a 50% reduced size spiral-shaped reactor 1301a and rectangular reactor 301a (full size). The FTC for reactor 1301a shows a peak centered at approximately 30 minutes, which still complies with minimum disinfection times (e.g., fluid exits reactor at a time later than 15 minutes). However, the FTC of the prior art reactor shows large amounts of tracer fluid appearing at approximately 13 minutes after insertion which is too early to meet minimum disinfection times.

TABLE 10

Reactor Performance of Spiral-shaped and Rectangular Reactors after 50% Size Reduction

| Criterion | Spiral-shaped Reactor | Rectangular Reactor | Plug Flow Reactor |
|---|---|---|---|
| $\Theta_{75}/\Theta_{25}$ | 0.086 (0.065) | 0.461 (0.561) | 0 |
| $\Theta_{90}-\Theta_{10}$ | 0.161 (0.117) | 0.816 (1.039) | 0 |
| $\Theta_{90}/\Theta_{10}$ | 1.19 (1.135) | 2.42 (2.924) | 1 |
| $\Theta_{50}$ | 0.921 (0.929) | 0.921 (0.923) | 1 |
| Variance | 0.047 (0.01) | 0.155 (0.203) | 0 |

Values in parentheses in TABLE 10 indicate values corresponding to full-size reactors (e.g., rectangular reactor 301a and spiral-shaped reactor 1301, described above), and values without parentheses correspond to reduced-size reactors (e.g., after a 50% size reduction). As shown, reduced size spiral-shaped reactor 1301a exhibits better flow characteristics (e.g., closer to plug flow) than even full-size rectangular reactor 301a for values of $\Theta_{75}-\Theta_{25}$, $\Theta_{90}-\Theta_{10}$, $\Theta_{90}/\Theta_{10}$, and variance, and shows a nearly identical $\Theta_{50}$ value. Thus, some embodiments of the present spiral-shaped disinfection reactors can be configured to replace existing disinfection reactors, where the spiral-shaped disinfection reactors are smaller (e.g., by physical dimension), without regard to maintaining total working water volume.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the devices are not intended to be limited to the particular forms disclosed. Rather, they include all modifications and alternatives falling within the scope of the claims, and embodiments other than the one shown may include some or all of the features of the depicted embodiment. For example, components may be omitted or combined as a unitary structure, and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments. The claims are not intended to include, and should not be interpreted to include, means-plus- or step-plus-function limitations, unless such a limitation is explicitly recited in a given claim using the phrase(s) "means for" or "step for," respectively.

REFERENCES

These references, to the extent that they provide exemplary procedural or other details supplementary to those set forth herein, are specifically incorporated herein by reference.

R. Amini, R. Taghipour, H. Mirgolbabaei, Numerical assessment of hydrodynamic characteristics in chlorine contact tank, *International Journal for Numerical Methods in Fluids,* 67 (2010) 885-98.

Amy, et al., *American Water Works Association.* 79:89-97, 1998.

Anastasios, Chemical Engineering and Processing. 47:1179-1189, 2008.
Baig, et al., *Technical Engineer.* 2008.
Bellar, et al., *Journal of the American Water Work Association.* 66:703, 1974.
Bird, et al., *Transport Phenomena*, $2^{nd}$ ed., John Wiley & Sons, 2006.
Boorman, et al., *Environmental Health Perspectives.* 107:207-217, 1999.
Bove, et al., *Environ Health Perspect.* 61-74, 2002.
Cardot, *Physico-chemical and Biological Processes,* 2002.
Carlier, General and Applied Hydraulics, *EYROLLES,* 1980.
Chang, et al., *Toxicological Environmental Chemistry.* 56:211-225, 1996.
Chowdhury, *American Water Works Association.* 53-64, 1999.
Chowdhury, et al., *Science of the Total Environment.* 407:4189-4206, 2009.
R. A. Falconer, A. I. B. M. Ismail, Numerical Modeling of Tracer Transport in a Contact Tank, *Environment International,* 23 (1997) 763-73.
R. A. Falconer, S. Liu, Modeling Solute Transport Using QUICK Scheme, *Journal of Environmental Engineering,* 114 (1988) 3-20.
D. Fidaros, C. Baxevanou, A. Zagoritis, P. E. Mpiska, N. Vlachos, Numerical Simulation of Flow and Transport Phenomena in an Urban Wastewater Chlorination Tank, in: $10^{th}$ *International Conference on Environmental Science and Technology,* Kos Island, Greece, 2007 pp. A371-A78. Gruau, in 2004.
V. Kothandaraman, R. L. Evans, Design and Performance of Chlorine Contact Tanks, in: *Illinois State Water Survey, Urbana,* 1974.
Krasner, et al., *Environmental Science and Technology.* 40:7175-7185, 2006.
Lekkas & Nikolaou, *Water Quality Research Journal of Canada.* 39:149-159, 2004.
O. Levenspiel, *Chemical Reaction Engineering, Third ed., John Wiley and Sons,* 1999.
Lewis, et al., *American Journal of Epidemiology.* 163:38-47, 2006.
Maux & Simonart, Microbiological Water Monitoring, *Technical Engineer.* 2010.
Mills, et al., in *Health Canada,* 1998.
Moles, Water Distribution. *Disinfection Techniques Engineering.* 2007.
Montiel, *The Halomethanes in Water—Training and Disposal,* Paris, 1980.
Oliver & Lawrence, *American Water Works Association,* 71:161-163, 1979.
Pontius, *Water Quality and Treatment,* 4th ed, New York, 1990.
Popa, *Numerical Modeling of Heat Transfer* (Finite volume method), 2002.
Rathbun, *Science of the Total Environment.* 180:125-135, 1996.
Rathbun, *Science of the Total Environment.* 191:235-244, 1996.
Richardson, et al., *Mutation Research.* 636:178-242, 2007.
Rodriguez, et al., *Journal of Water Supply: Research and Technology.* 49:57-73, 2000.
Semerjian, et al., *Environmental Monitoring and Assessment.* 149:429-436, 2008.
Serodes, et al., *Chemosphere.* 51:253-263, 2003.
A. I. Stamou, Improving the hydraulic efficiency of water process tanks using CFD models, *Chemical Engineering and Processing: Process Intensification,* 47 (2008) 1179-89.
A. I. Stamou, Verification and application of a mathematical model for the assessment of the effect of guiding walls on the hydraulic efficiency of chlorination tanks, *Journal of Hydroinformatics,* 4 (2002) 245-54.
A. I. Stamou, G. Noutsopoulos, Evaluating the effect of inlet arrangement in settling tanks using the hydraulic efficiency diagram, *Water SA,* 20 (1994) 77-84.
Tchobanoglous, et al., *Wastewater Engineering, Treatment and Reuse,* New York, 2002. Uyak & Toroz, Desalination. 176:127-141, 2005.
Villanueva et al., *Epidemiology* 15(3):357-367, 2004.
Villanueva, et al., Am J Epidemiol. 2007.
H. Wang, R. A. Falconer, Simulating disinfection processes in chlorine contact tanks using various turbulence models and high-order accurate difference schemes, *Water Research,* 32 (1998) 1529-43.
Ward, et al., *Applied and environmental. Microbiology.* 48:508-514, 1984.
E. W. Weisstein, "Archimedes' Spiral." From Math-World—A Wolfram Web Resource. in. WHO, 1:117-126, 1994. WHO, 2:913-949, 1994.
Yoon, et al., *Science of the Total Environment.* 30:157-156, 2003.
Zhang, et al., *Journal of Hydroinformatics,* 02:123-132, 2000.

The invention claimed is:

1. A disinfection reactor comprising:
a body defining:
a mixing chamber centrally located in the body;
an inlet fluidly connected to the mixing chamber, the inlet separated from the mixing chamber by a wall, wherein the mixing chamber is fluidly connected to the inlet by fluid overflowing the wall;
an outlet opening; and
a spiral flow path extending between the inlet and the outlet opening;
where a radius of curvature of the spiral flow path increases along the spiral flow path from the inlet to the outlet opening; and
where the mixing chamber is configured to directly receive water and a disinfectant from outside the reactor, and the water and the disinfectant overflow the wall from the mixing chamber to the inlet, and the water is exposed to the disinfectant as the water flows through the spiral flow path.

2. The disinfection reactor of claim 1, where the body comprises a sidewall disposed between adjacent portions of the spiral flow path.

3. The disinfection reactor of claim 2, where:
the spiral flow path has a first length extending from the inlet to the outlet opening; and
the sidewall has a second length that is substantially equal to the first length.

4. The disinfection reactor of claim 1, where the spiral flow path is substantially planar.

5. The disinfection reactor of claim 1, where no portion of the spiral flow path overlies any other portion of the spiral flow path.

6. A disinfection reactor comprising:
a body having a mixing chamber centrally located in the body, an inlet, an outlet, and a spiral flow path between the inlet and the outlet;

the inlet is separated from the mixing chamber by a wall, wherein the mixing chamber is fluidly connected to the inlet by fluid overflowing the wall;

where the mixing chamber is configured to directly receive water and a disinfectant from outside the reactor, and the water and the disinfectant overflow the wall from the mixing chamber to the inlet, and the water is exposed to the disinfectant as the water flows through the spiral flow path.

7. The disinfection reactor of claim 6, where the outlet is in the interior of the spiral.

8. The disinfection reactor of claim 6, where the inlet is in the interior of the spiral.

9. The disinfection reactor of claim 6, where at least one of the inlet and the outlet comprises a plurality of openings.

10. The disinfection reactor of claim 6, where the spiral flow path has a length extending from the inlet to the outlet, and a width that is substantially constant along the spiral flow path.

11. The disinfection reactor of claim 6, where the spiral flow path is an Archimedean spiral.

12. The disinfection reactor of claim 6, where an arc length, S, of the spiral flow path is a function of an angle, $\alpha$, such that $$S(\alpha) = \frac{1}{2}a\{\alpha\sqrt{1+\alpha^2} + \ln(\alpha + \sqrt{1+\alpha^2})\},$$

where a is a constant indicative of a width of spiral flow path.

13. The disinfection reactor of claim 6, where the spiral flow path is sized such that a volume of tracer inserted at the inlet with water flowing in the spiral flow path takes a time, $t_{10}$, for 10% of the tracer volume to pass the outlet and a time, $t_{90}$, for 90% of the tracer volume to pass the outlet, and such that $$\frac{t_{90}}{t_{10}}$$

is between 1 and 1.4 for water flow rates between 1 and 12 $m^3/s$.

14. The disinfection reactor of claim 6, where the inlet is coupled directly to the mixing chamber.

15. The disinfection reactor of claim 14, where the mixing chamber is configured to discharge overflow into the inlet.

16. A disinfection process comprising:
introducing water and a disinfectant into an inlet of a spiral-shaped reactor, the reactor having:
a body having a mixing chamber centrally located in the body, an inlet, an outlet, and a spiral flow path between the inlet and the outlet;
the inlet separated from the mixing chamber by a wall, wherein water and disinfectant in the mixing chamber overflow the wall into the inlet; the body having a spiral flow path between the inlet and the outlet such that the water is exposed to the disinfectant in the spiral flow path and exits the outlet.

17. The disinfection process of claim 16, where the disinfectant comprises chlorine.

18. The disinfection process of claim 16, where flow of the water and the disinfectant introduced at the inlet has a substantially uniform exposure time in the spiral flow path across a range of flow rates.

* * * * *